United States Patent
Kim et al.

(10) Patent No.: US 11,770,724 B2
(45) Date of Patent: Sep. 26, 2023

(54) MOBILE TERMINAL FOR DISPLAYING WHETHER QOS IS SATISFIED IN WIRELESS COMMUNICATION SYSTEM

(71) Applicant: LG ELECTRONICS INC., Seoul (KR)

(72) Inventors: Laeyoung Kim, Seoul (KR); Sungduck Chun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 281 days.

(21) Appl. No.: 17/264,274

(22) PCT Filed: Aug. 5, 2019

(86) PCT No.: PCT/KR2019/009739
§ 371 (c)(1),
(2) Date: Jan. 28, 2021

(87) PCT Pub. No.: WO2020/027639
PCT Pub. Date: Feb. 6, 2020

(65) Prior Publication Data
US 2021/0306887 A1    Sep. 30, 2021

(30) Foreign Application Priority Data

Aug. 3, 2018   (KR) .................. 10-2018-0090878

(51) Int. Cl.
*H04W 24/08*    (2009.01)
(52) U.S. Cl.
CPC .................... *H04W 24/08* (2013.01)

(58) Field of Classification Search
CPC ....... H04W 24/08; H04W 24/10; H04W 4/40; H04W 24/02; H04W 28/02; H04W 68/00
See application file for complete search history.

(56) References Cited

U.S. PATENT DOCUMENTS

2017/0359749 A1  12/2017  Dao
2018/0205595 A1* 7/2018  Abbondanzio ..... H04L 41/0654
(Continued)

FOREIGN PATENT DOCUMENTS

JP    2016053518       4/2016
JP    2016053518 A  *  4/2016

OTHER PUBLICATIONS

3GPP TR 23.791 Study of Enablers for Network Automation for 5G V0.5.0 Jul. 2018 (Year: 2018).*

(Continued)

*Primary Examiner* — Nicholas Sloms
*Assistant Examiner* — David Zhijun Sun
(74) *Attorney, Agent, or Firm* — LEE, HONG, DEGERMAN, KANG & WAIMEY PC

(57) ABSTRACT

An embodiment of the present invention relates to a mobile terminal comprising: a display unit for displaying a driving route and whether a quality of service (QoS) is satisfied; and a control unit for controlling the display unit, wherein whether the QoS is satisfied is on the basis of information received from a server having received a notify related to a QoS prediction from a network data analytics function (NWDAF), the notify related to the Qos prediction is resulted from a request associated with a QoS prediction subscription transmitted by the server to the NWDAF, and the request includes a QoS requirement for the QoS prediction.

12 Claims, 17 Drawing Sheets

(56) References Cited

U.S. PATENT DOCUMENTS

2019/0222489 A1* 7/2019 Shan ................. H04M 15/8033
2020/0252813 A1* 8/2020 Li ......................... G06Q 20/382
2021/0114616 A1* 4/2021 Altman ................. H04W 8/205

OTHER PUBLICATIONS

3GPP TR 22.886 Study on enhancement of 3GPP Support for 5G V2X Services V16.0.0 Jun. 2018 (Year: 2018).*
PCT International Application No. PCT/KR2019/009739, International Search Report dated Nov. 27, 2019, 18 pages.
Huawei, HiSilicon, "New Key Issue and Solution for Dynamic Application Adjustment.," SA WG2 Meeting #128, Tdoc S2-186843, Jul. 2018, 3 pages.
Orange, et al., "Recommendations produced by NWDAF," SA WG2 Meeting #S2-128, Tdoc S2-187618, Jul. 2018, 6 pages.
LG Electronics, "Study on Improvement of V2X service Handling," 3GPP TSG SA WG1 Meeting #81, S1-180451, Feb. 2018, 3 pages.

* cited by examiner (a)

(b)

(a)

(b)

MOBILE TERMINAL FOR DISPLAYING WHETHER QOS IS SATISFIED IN WIRELESS COMMUNICATION SYSTEM

CROSS-REFERENCE TO RELATED APPLICATIONS

This application is the National Stage filing under 35 U.S.C. 371 of International Application No. PCT/KR2019/009739, filed on Aug. 5, 2019, which claims the benefit of earlier filing date and right of priority to Korean Patent Application No. 10-2018-0090878, filed on Aug. 3, 2018, the contents of which are all hereby incorporated by reference herein in their entirety.

TECHNICAL FIELD

The present disclosure relates to a wireless communication system, and more specifically, a mobile terminal device that displays whether QoS is satisfied.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

Wireless communication systems adopt various radio access technologies (RATs) such as long term evolution (LTE), LTE-advanced (LTE-A), and wireless fidelity (WiFi). 5th generation (5G) is one of them. Three key requirement areas of 5G include (1) enhanced mobile broadband (eMBB), (2) massive machine type communication (mMTC), and (3) ultra-reliable and low latency communications (URLLC). Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, and media and entertainment applications in the cloud or augmented reality (AR). Data is one of the key drivers for 5G and in the 5G era, we may see no dedicated voice service for the first time. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is augmented reality (AR) for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple use cases will be described in greater detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup may be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G.

Finally, logistics and freight tracking are important use cases for mobile communications that enable the tracking of inventory and packages wherever they are by using location-based information systems. The logistics and freight tracking use cases typically require lower data rates but need wide coverage and reliable position information.

DISCLOSURE

Technical Purpose

A purpose of the present disclosure is to provide a method in which a mobile terminal device receives, processes, and displays information related to whether QoS is satisfied.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

One aspect of the present disclosure provides a mobile terminal device comprising: a display for displaying a travel path and whether QoS (Quality of Service) is satisfied; and a controller configured to control the display, wherein whether the QoS is satisfied is based on information received from a server having received a notification related to QoS prediction from a network data analytics function (NWDAF), wherein the notification related to the QoS prediction is due to a request related to a QoS prediction subscription transmitted from the server to the NWDAF, wherein the request includes a QoS requirement for the QoS prediction.

In one implementation, the information received from the server includes a notification indicating that QoS is satisfied or not.

In one implementation, the information received from the server indicates whether QoS is satisfied in at least one of a predetermined area or a predetermined time.

In one implementation, whether QoS is satisfied is displayed on a map indicating the travel path on the display.

In one implementation, when the information received from the server indicates that QoS is not satisfied, a warning guide is displayed on the display.

In one implementation, the warning guide is displayed together specific information about QoS.

In one implementation, when the information received from the server indicates that QoS is not satisfied, a message indicating that a predetermined application is terminated after a predetermined time duration has elapsed is displayed on the display.

In one implementation, the predetermined application is one of automatic driving or cluster driving.

In one implementation, whether QoS is satisfied is displayed such that a portion of the travel path in which QoS is satisfied and a portion of the travel path in which QoS is not satisfied are displayed in preset colors, respectively.

In one implementation, the QoS requirement includes at least one of QoS PDB (Packet Delay Budget), PER (Packet Error Rate), or GBR (Guaranteed Bit Rate).

In one implementation, the request includes information related to an area of the QoS prediction, wherein the area-related information includes at least one of path-related information, geographic region information, and area-related coordinate information.

In one implementation, the request includes QoS-related threshold level information, wherein the threshold level information includes QoS KPI.

In one implementation, the notification includes at least one of information about an area in which QoS change occurs or information or information about a time in which QoS change occurs.

Technical Effects

According to the present disclosure, the user may know whether QoS is satisfied on a travel path, such that necessary safety measures such as stopping the automatic driving may be achieved.

It will be appreciated by persons skilled in the art that the effects that may be achieved with the present disclosure are not limited to what has been particularly described hereinabove and other advantages of the present disclosure will be more clearly understood from the following detailed description taken in conjunction with the accompanying drawings.

BRIEF DESCRIPTIONS OF DRAWINGS

The accompanying drawings, which are included to provide a further understanding of the present disclosure and are incorporated in and constitute a part of this application, illustrate embodiments of the present disclosure and together with the description serve to explain the principle of the disclosure.

DETAILED DESCRIPTIONS

Figure 1:
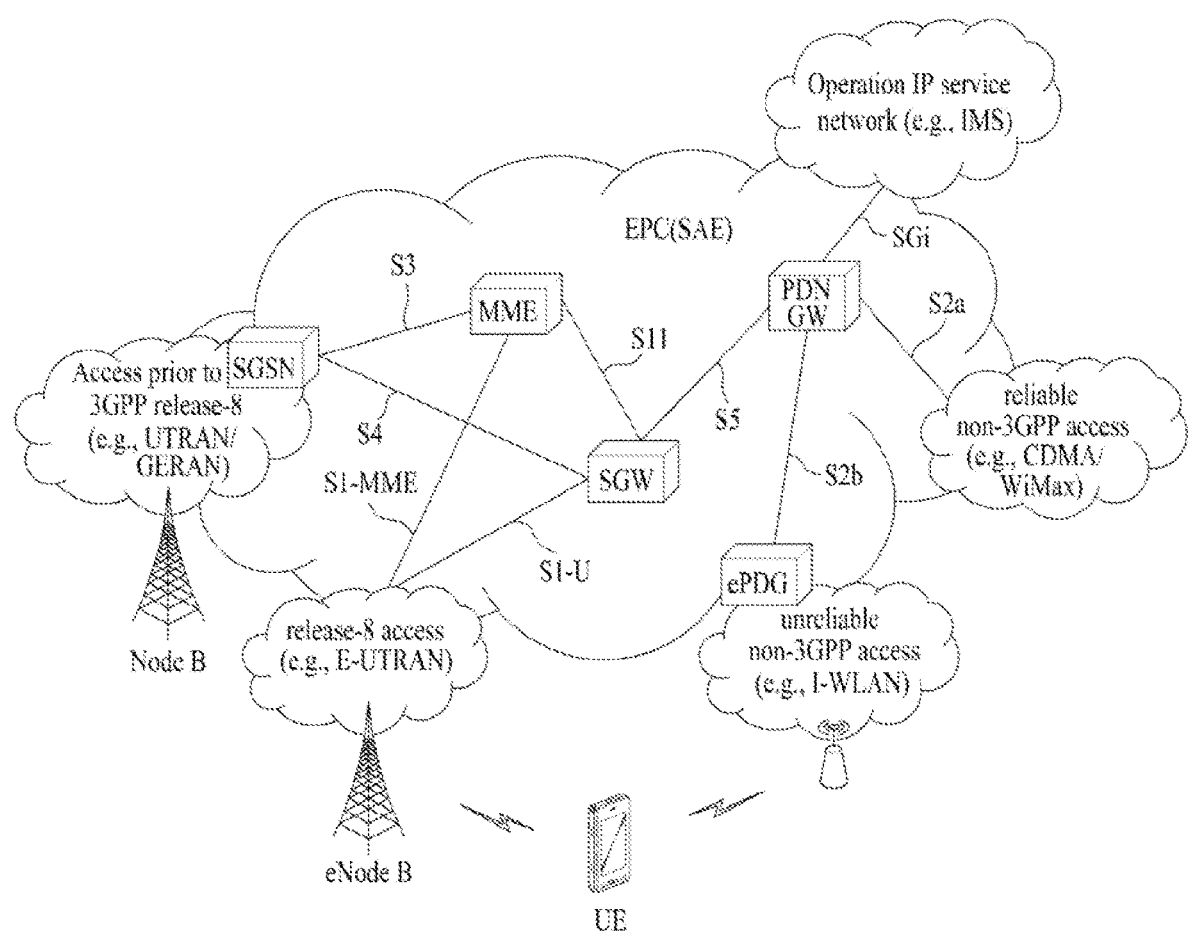
FIG. 1 is a schematic diagram illustrating the structure of an evolved packet system (EPS) including an evolved packet core (EPC).

The embodiments below are combinations of components and features of the present disclosure in a prescribed form. Each component or feature may be considered as selective unless explicitly mentioned as otherwise. Each component or feature may be executed in a form that is not combined with other components and features. Further, some components and/or features may be combined to configure an embodiment of the present disclosure. The order of operations described in the embodiments of the present disclosure may be changed. Some components or features of an embodiment may be included in another embodiment or may be substituted with a corresponding component or feature of the present disclosure.

Specific terms used in the description below are provided to help an understanding of the present disclosure, and the use of such specific terms may be changed to another form within the scope of the technical concept of the present disclosure.

In some cases, in order to avoid obscurity of the concept of the present disclosure, a known structure and apparatus may be omitted, or a block diagram centering on core functions of each structure or apparatus may be used. Moreover, the same reference numerals are used for the same components throughout the present specification.

The embodiments of the present disclosure may be supported by standard documents disclosed with respect to at least one of IEEE (Institute of Electrical and Electronics Engineers) 802 group system, 3GPP system, 3GPP LTE & LTE-A system and 3GPP2 system. Namely, the steps or portions having not been described in order to clarify the technical concept of the present disclosure in the embodiments of the present disclosure may be supported by the above documents. Furthermore, all terms disclosed in the present document may be described according to the above standard documents.

The technology below may be used for various wireless communication systems. For clarity, the description below centers on 3GPP LTE and 3GPP LTE-A, by which the technical idea of the present disclosure is non-limited.

Terms used in the present document are defined as follows.

UMTS (Universal Mobile Telecommunications System): a GSM (Global System for Mobile Communication) based third generation mobile communication technology developed by the 3GPP.

EPS (Evolved Packet System): a network system that includes an EPC (Evolved Packet Core) which is an IP (Internet Protocol) based packet switched core network and an access network such as LTE and UTRAN. This system is the network of an evolved version of the UMTS.

NodeB: a base station of GERAN/UTRAN. This base station is installed outdoor and its coverage has a scale of a macro cell.

eNodeB: a base station of LTE. This base station is installed outdoor and its coverage has a scale of a macro cell.

UE (User Equipment): the UE may be referred to as terminal, ME (Mobile Equipment), MS (Mobile Station), etc. Also, the UE may be a portable device such as a notebook computer, a cellular phone, a PDA (Personal Digital Assistant), a smart phone, and a multimedia device. Alternatively, the UE may be a non-portable device such as a PC (Personal Computer) and a vehicle mounted device. The term "UE", as used in relation to MTC, may refer to an MTC device.

HNB (Home NodeB): a base station of UMTS network. This base station is installed indoor and its coverage has a scale of a micro cell.

HeNB (Home eNodeB): a base station of an EPS network. This base station is installed indoor and its coverage has a scale of a micro cell.

MME (Mobility Management Entity): a network node of an EPS network, which performs mobility management (MM) and session management (SM).

PDN-GW (Packet Data Network-Gateway)/PGW: a network node of an EPS network, which performs UE IP address allocation, packet screening and filtering, charging data collection, etc.

SGW (Serving Gateway): a network node of an EPS network, which performs mobility anchor, packet routing, idle-mode packet buffering, and triggering of an MME's UE paging.

NAS (Non-Access Stratum): an upper stratum of a control plane between a UE and an MME. This is a functional layer for transmitting and receiving a signaling and traffic message between a UE and a core network in an LTE/UMTS protocol stack, and supports mobility of a UE, and supports a session management procedure of establishing and maintaining IP connection between a UE and a PDN GW.

PDN (Packet Data Network): a network in which a server supporting a specific service (e.g., a Multimedia Messaging Service (MMS) server, a Wireless Application Protocol (WAP) server, etc.) is located.

PDN connection: a logical connection between a UE and a PDN, represented as one IP address (one IPv4 address and/or one IPv6 prefix).

RAN (Radio Access Network): a unit including a Node B, an eNode B, and a Radio Network Controller (RNC) for controlling the Node B and the eNode B in a 3GPP network, which is present between UEs and provides a connection to a core network.

HLR (Home Location Register)/HSS (Home Subscriber Server): a database having subscriber information in a 3GPP network. The HSS may perform functions such as configuration storage, identity management, and user state storage.

PLMN (Public Land Mobile Network): a network configured for the purpose of providing mobile communication services to individuals. This network may be configured per operator.

Proximity Services (or ProSe Service or Proximity-based Service): a service that enables discovery between physically proximate devices, and mutual direct communication/communication through a base station/communication through the third party. At this time, user plane data is exchanged through a direct data path without passing through a 3GPP core network (e.g., EPC).

EPC (Evolved Packet Core)

FIG. 1 is a schematic diagram showing the structure of an evolved packet system (EPS) including an evolved packet core (EPC).

The EPC is a core element of system architecture evolution (SAE) for improving performance of 3GPP technology. SAE corresponds to a research project for determining a network structure supporting mobility between various types of networks. For example, SAE aims to provide an optimized packet-based system for supporting various radio access technologies and providing an enhanced data transmission capability.

Specifically, the EPC is a core network of an IP mobile communication system for 3GPP LTE and may support real-time and non-real-time packet-based services. In conventional mobile communication systems (i.e. second-generation or third-generation mobile communication systems), functions of a core network are implemented through a circuit-switched (CS) sub-domain for voice and a packet-switched (PS) sub-domain for data. However, in a 3GPP LTE system which is evolved from the third generation communication system, CS and PS sub-domains are unified into one IP domain. That is, in 3GPP LTE, connection of terminals having IP capability may be established through an IP-based business station (e.g., an eNodeB (evolved Node B)), EPC, and an application domain (e.g., IMS). That is, the EPC is an essential structure for end-to-end IP services.

The EPC may include various components. FIG. 1 shows some of the components, namely, a serving gateway (SGW), a packet data network gateway (PDN GW), a mobility management entity (MME), a serving GPRS (general packet radio service) supporting node (SGSN) and an enhanced packet data gateway (ePDG).

SGW (or S-GW) operates as a boundary point between a radio access network (RAN) and a core network and maintains a data path between an eNodeB and the PDN GW. When a terminal moves over an area served by an eNodeB, the SGW functions as a local mobility anchor point. That is, packets may be routed through the SGW for mobility in an evolved UMTS terrestrial radio access network (E-UTRAN) defined after 3GPP release-8. In addition, the SGW may serve as an anchor point for mobility of another 3GPP network (a RAN defined before 3GPP release-8, e.g., UTRAN or GERAN (global system for mobile communication (GSM)/enhanced data rates for global evolution (EDGE) radio access network).

The PDN GW (or P-GW) corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an unreliable network such as an interworking wireless local area network (I-WLAN) and a reliable network such as a code division multiple access (CDMA) or WiMax network).

Although the SGW and the PDN GW are configured as separate gateways in the example of the network structure of FIG. 1, the two gateways may be implemented according to a single gateway configuration option.

The MME performs signaling and control functions for supporting access of a UE for network connection, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., a GPRS network).

The ePDG serves as a security node for a non-3GPP network (e.g., an I-WLAN, a Wi-Fi hotspot, etc.).

As described above with reference to FIG. 1, a terminal having IP capabilities may access an IP service network (e.g., an IMS) provided by an operator via various elements in the EPC not only based on 3GPP access but also based on non-3GPP access.

Additionally, FIG. 1 shows various reference points (e.g. S1-U, S1-MME, etc.). In 3GPP, a conceptual link connecting two functions of different functional entities of an E-UTRAN and an EPC is defined as a reference point. Table 1 is a list of the reference points shown in FIG. 1. Various reference points may be present in addition to the reference points in Table 1 according to network structures.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point may be used intra-PLMN or inter-PLMN (e.g. in the case of Inter-PLMN HO). |
| S4 | It provides related control and mobility support between GPRS Core and the 3GPP Anchor function of Serving GW. In addition, when Direct Tunnel is not established, it provides the user plane tunneling. |
| S5 | It provides user plane tunneling and tunnel management between Serving GW and PDN GW. It is used for Serving GW relocation due to UE mobility and when the Serving GW needs to connect to a non-collocated PDN GW for the required PDN connectivity. |

TABLE 1-continued

| Reference point | Description |
| --- | --- |
| S11 | Reference point between an MME and an SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points shown in FIG. 1, S2a and S2b correspond to non-3GPP interfaces. S2a is a reference point which provides reliable non-3GPP access and related control and mobility support between PDN GWs to a user plane. S2b is a reference point which provides related control and mobility support between the ePDG and the PDN GW to the user plane.

Figure 2:
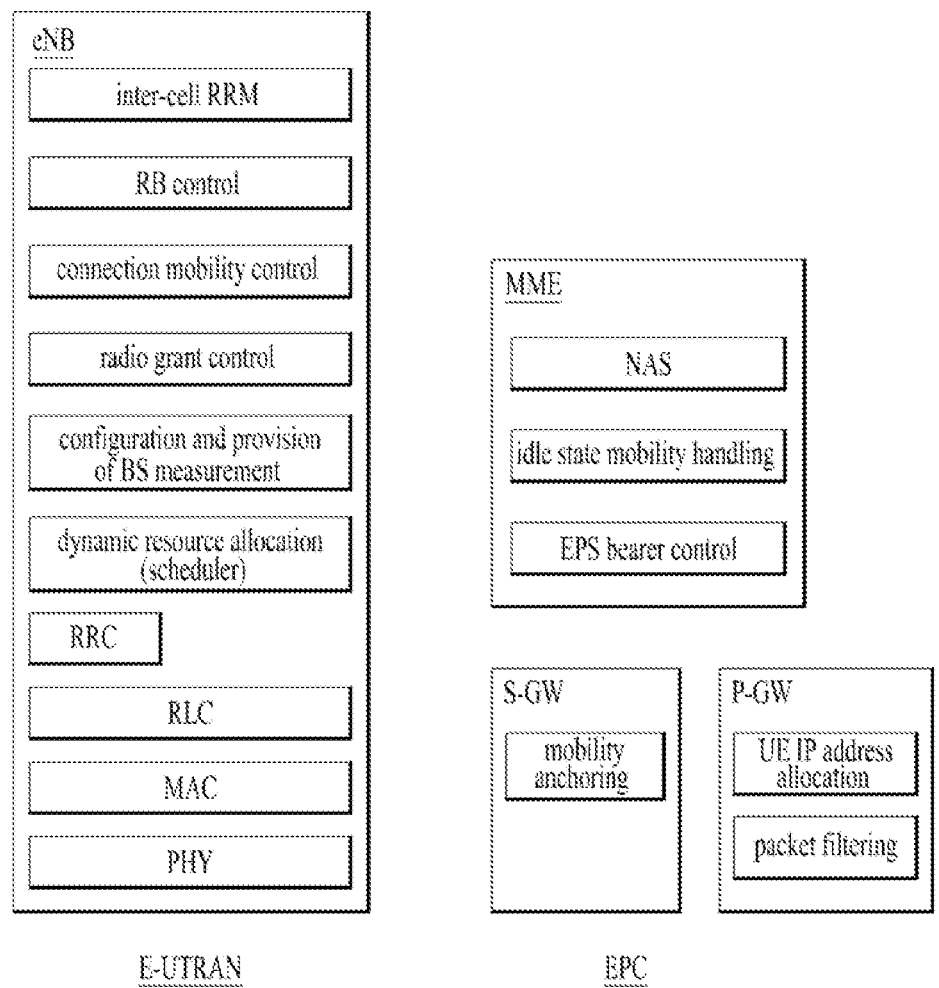
FIG. 2 is a diagram illustrating the general architectures of an E-UTRAN and an EPC.

FIG. 2 is a diagram exemplarily illustrating architectures of a typical E-UTRAN and EPC.

As shown in the figure, while radio resource control (RRC) connection is activated, an eNodeB may perform routing to a gateway, scheduling transmission of a paging message, scheduling and transmission of a broadcast channel (BCH), dynamic allocation of resources to a UE on uplink and downlink, configuration and provision of eNodeB measurement, radio bearer control, radio admission control, and connection mobility control. In the EPC, paging generation, LTE IDLE state management, ciphering of the user plane, SAE bearer control, and ciphering and integrity protection of NAS signaling.

Figure 3:
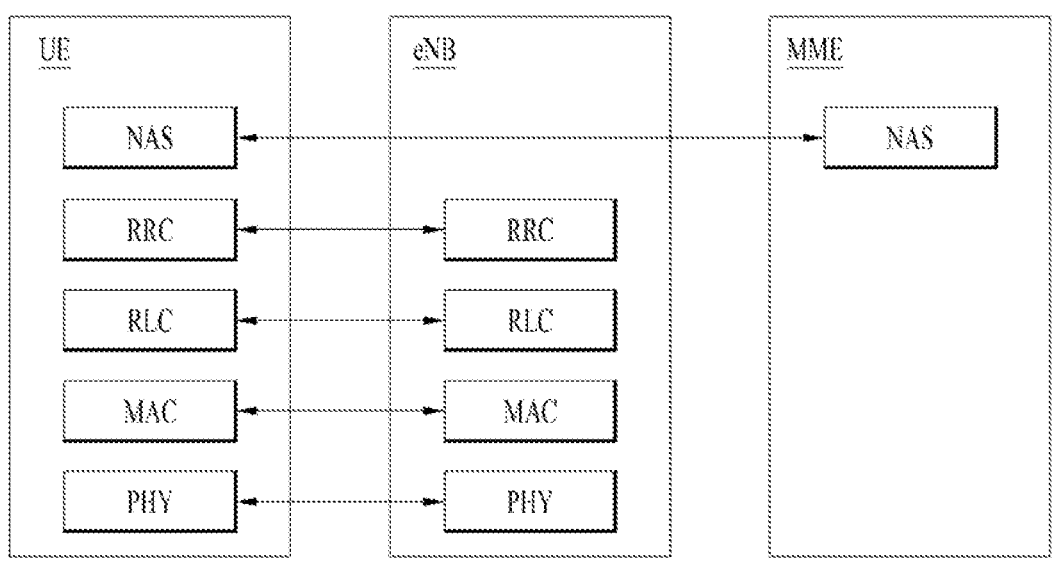
FIG. 3 is a diagram illustrating the structure of a radio interface protocol in a control plane.
Figure 4:
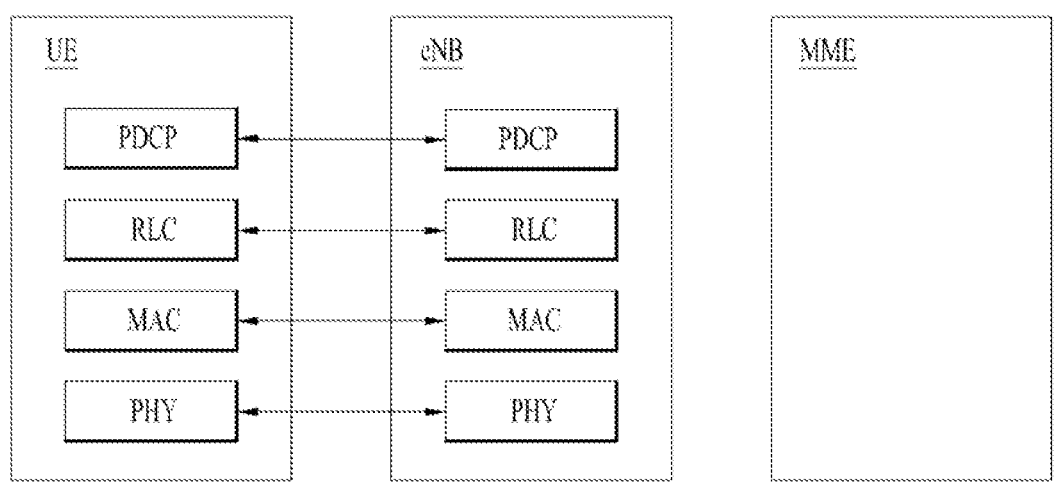
FIG. 4 is a diagram illustrating the structure of a radio interface protocol in a user plane.

FIG. 3 is a diagram exemplarily illustrating the structure of a radio interface protocol in a control plane between a UE and a base station, and FIG. 4 is a diagram exemplarily illustrating the structure of a radio interface protocol in a user plane between the UE and the base station.

The radio interface protocol is based on the 3GPP wireless access network standard. The radio interface protocol horizontally includes a physical layer, a data link layer, and a networking layer. The radio interface protocol is divided into a user plane for transmission of data information and a control plane for delivering control signaling which are arranged vertically.

The protocol layers may be classified into a first layer (L1), a second layer (L2), and a third layer (L3) based on the three sublayers of the open system interconnection (OSI) model that is well known in the communication system.

Hereinafter, description will be given of a radio protocol in the control plane shown in FIG. 3 and a radio protocol in the user plane shown in FIG. 4.

The physical layer, which is the first layer, provides an information transfer service using a physical channel. The physical channel layer is connected to a medium access control (MAC) layer, which is a higher layer of the physical layer, through a transport channel. Data is transferred between the physical layer and the MAC layer through the transport channel. Transfer of data between different physical layers, i.e., a physical layer of a transmitter and a physical layer of a receiver is performed through the physical channel.

The physical channel consists of a plurality of subframes in the time domain and a plurality of subcarriers in the frequency domain. One subframe consists of a plurality of symbols in the time domain and a plurality of subcarriers. One subframe consists of a plurality of resource blocks. One resource block consists of a plurality of symbols and a plurality of subcarriers. A Transmission Time Interval (TTI), a unit time for data transmission, is 1 ms, which corresponds to one subframe.

According to 3GPP LTE, the physical channels present in the physical layers of the transmitter and the receiver may be divided into data channels corresponding to Physical Downlink Shared Channel (PDSCH) and Physical Uplink Shared Channel (PUSCH) and control channels corresponding to Physical Downlink Control Channel (PDCCH), Physical Control Format Indicator Channel (PCFICH), Physical Hybrid-ARQ Indicator Channel (PHICH) and Physical Uplink Control Channel (PUCCH).

The second layer includes various layers.

First, the MAC layer in the second layer serves to map various logical channels to various transport channels and also serves to map various logical channels to one transport channel. The MAC layer is connected with an RLC layer, which is a higher layer, through a logical channel. The logical channel is broadly divided into a control channel for transmission of information of the control plane and a traffic channel for transmission of information of the user plane according to the types of transmitted information.

The radio link control (RLC) layer in the second layer serves to segment and concatenate data received from a higher layer to adjust the size of data such that the size is suitable for a lower layer to transmit the data in a radio interval.

The Packet Data Convergence Protocol (PDCP) layer in the second layer performs a header compression function of reducing the size of an IP packet header which has a relatively large size and contains unnecessary control information, in order to efficiently transmit an IP packet such as an IPv4 or IPv6 packet in a radio interval having a narrow bandwidth. In addition, in LTE, the PDCP layer also performs a security function, which consists of ciphering for preventing a third party from monitoring data and integrity protection for preventing data manipulation by a third party.

The Radio Resource Control (RRC) layer, which is located at the uppermost part of the third layer, is defined only in the control plane, and serves to configure radio bearers (RBs) and control a logical channel, a transport channel, and a physical channel in relation to reconfiguration and release operations. The RB represents a service provided by the second layer to ensure data transfer between a UE and the E-UTRAN.

If an RRC connection is established between the RRC layer of the UE and the RRC layer of a wireless network, the UE is in the RRC Connected mode. Otherwise, the UE is in the RRC Idle mode.

Hereinafter, description will be given of the RRC state of the UE and an RRC connection method. The RRC state refers to a state in which the RRC of the UE is or is not logically connected with the RRC of the E-UTRAN. The RRC state of the UE having logical connection with the RRC of the E-UTRAN is referred to as an RRC_CONNECTED state. The RRC state of the UE which does not have logical connection with the RRC of the E-UTRAN is referred to as an RRC_IDLE state. A UE in the RRC_CONNECTED state has RRC connection, and thus the E-UTRAN may recognize presence of the UE in a cell unit. Accordingly, the UE may be efficiently controlled. On the other hand, the E-UTRAN cannot recognize presence of a UE which is in the RRC_IDLE state. The UE in the RRC_IDLE state is managed by a core network in a tracking area (TA) which is an area unit larger than the cell. That is, for the UE in the RRC_IDLE state, only presence or absence of the UE is recognized in an area unit larger than the cell. In order for the UE in the RRC_IDLE state to be provided with a usual mobile communication service such as a voice service and a data service, the UE should transition to the RRC_CONNECTED state. A TA is distinguished from another TA by a tracking area identity (TAI) thereof. A UE may configure the TAI through a tracking area code (TAC), which is information broadcast from a cell.

When the user initially turns on the UE, the UE searches for a proper cell first. Then, the UE establishes RRC connection in the cell and registers information thereabout in the core network. Thereafter, the UE stays in the RRC_IDLE state. When necessary, the UE staying in the RRC_IDLE state selects a cell (again) and checks system information or paging information. This operation is called camping on a cell. Only when the UE staying in the RRC_IDLE state needs to establish RRC connection, does the UE establish RRC connection with the RRC layer of the E-UTRAN through the RRC connection procedure and transition to the RRC_CONNECTED state. The UE staying in the RRC_IDLE state needs to establish RRC connection in many cases. For example, the cases may include an attempt of a user to make a phone call, an attempt to transmit data, or transmission of a response message after reception of a paging message from the E-UTRAN.

The non-access stratum (NAS) layer positioned over the RRC layer performs functions such as session management and mobility management.

Hereinafter, the NAS layer shown in FIG. 3 will be described in detail.

The eSM (evolved Session Management) belonging to the NAS layer performs functions such as default bearer management and dedicated bearer management to control a UE to use a PS service from a network. The UE is assigned a default bearer resource by a specific packet data network (PDN) when the UE initially accesses the PDN. In this case, the network allocates an available IP to the UE to allow the UE to use a data service. The network also allocates QoS of a default bearer to the UE. LTE supports two kinds of bearers. One bearer is a bearer having characteristics of guaranteed bit rate (GBR) QoS for guaranteeing a specific bandwidth for transmission and reception of data, and the other bearer is a non-GBR bearer which has characteristics of best effort QoS without guaranteeing a bandwidth. The default bearer is assigned to a non-GBR bearer. The dedicated bearer may be assigned a bearer having QoS characteristics of GBR or non-GBR.

A bearer allocated to the UE by the network is referred to as an evolved packet service (EPS) bearer. When the EPS bearer is allocated to the UE, the network assigns one identifier (ID). This ID is called an EPS bearer ID. One EPS bearer has QoS characteristics of a maximum bit rate (MBR) and/or a guaranteed bit rate (GBR).

Figure 5:
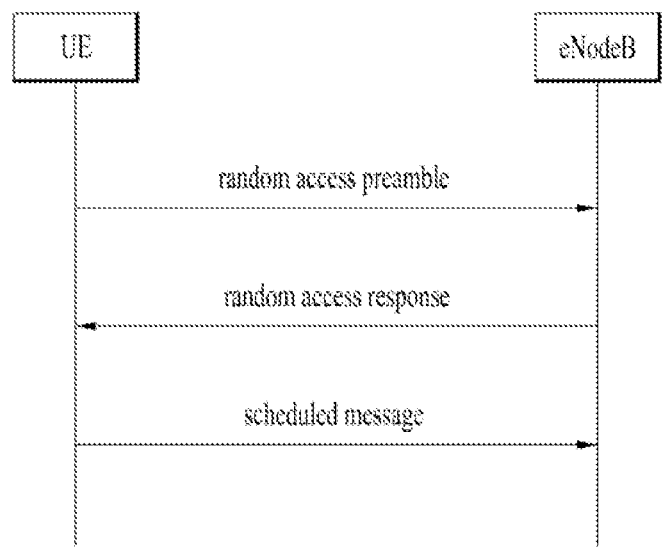
FIG. 5 is a flowchart illustrating a random access procedure.

FIG. 5 is a flowchart illustrating a random access procedure in 3GPP LTE.

The random access procedure is used for a UE to obtain UL synchronization with an eNB or to be assigned a UL radio resource.

The UE receives a root index and a physical random access channel (PRACH) configuration index from an eNodeB. Each cell has 64 candidate random access preambles defined by a Zadoff-Chu (ZC) sequence. The root index is a logical index used for the UE to generate 64 candidate random access preambles.

Transmission of a random access preamble is limited to a specific time and frequency resources for each cell. The PRACH configuration index indicates a specific subframe and preamble format in which transmission of the random access preamble is possible.

The UE transmits a randomly selected random access preamble to the eNodeB. The UE selects a random access preamble from among 64 candidate random access preambles and the UE selects a subframe corresponding to the PRACH configuration index. The UE transmits the selected random access preamble in the selected subframe.

Upon receiving the random access preamble, the eNodeB sends a random access response (RAR) to the UE. The RAR is detected in two steps. First, the UE detects a PDCCH masked with a random access (RA)-RNTI. The UE receives an RAR in a MAC (medium access control) PDU (protocol data unit) on a PDSCH indicated by the detected PDCCH.

Figure 6:
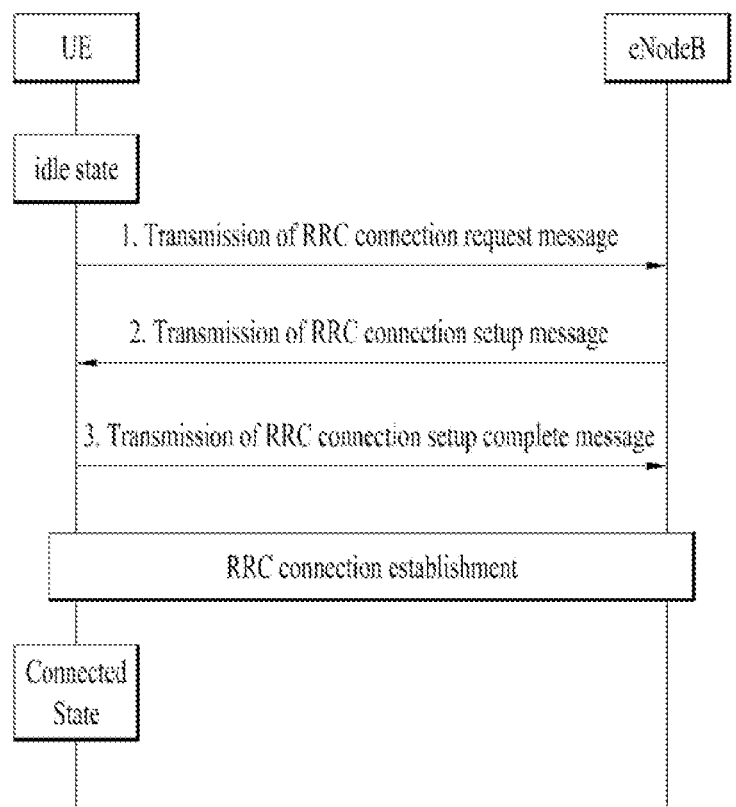
FIG. 6 is a diagram illustrating a connection process in a radio resource control (RRC) layer.

FIG. 6 illustrates a connection procedure in a radio resource control (RRC) layer.

As shown in FIG. 6, the RRC state is set according to whether or not RRC connection is established. An RRC state indicates whether or not an entity of the RRC layer of a UE has logical connection with an entity of the RRC layer of an eNodeB. An RRC state in which the entity of the RRC layer of the UE is logically connected with the entity of the RRC layer of the eNodeB is called an RRC connected state. An RRC state in which the entity of the RRC layer of the UE is not logically connected with the entity of the RRC layer of the eNodeB is called an RRC idle state.

A UE in the Connected state has RRC connection, and thus the E-UTRAN may recognize presence of the UE in a cell unit. Accordingly, the UE may be efficiently controlled. On the other hand, the E-UTRAN cannot recognize presence of a UE which is in the idle state. The UE in the idle state is managed by the core network in a tracking area unit which is an area unit larger than the cell. The tracking area is a unit of a set of cells. That is, for the UE which is in the idle state, only presence or absence of the UE is recognized in a larger area unit. In order for the UE in the idle state to be provided with a usual mobile communication service such as a voice service and a data service, the UE should transition to the connected state.

When the user initially turns on the UE, the UE searches for a proper cell first, and then stays in the idle state. Only when the UE staying in the idle state needs to establish RRC connection, the UE establishes RRC connection with the RRC layer of the eNodeB through the RRC connection procedure and then performs transition to the RRC connected state.

The UE staying in the idle state needs to establish RRC connection in many cases. For example, the cases may include an attempt of a user to make a phone call, an attempt to transmit data, or transmission of a response message after reception of a paging message from the E-UTRAN.

In order for the UE in the idle state to establish RRC connection with the eNodeB, the RRC connection procedure needs to be performed as described above. The RRC connection procedure is broadly divided into transmission of an RRC connection request message from the UE to the eNodeB, transmission of an RRC connection setup message from the eNodeB to the UE, and transmission of an RRC connection setup complete message from the UE to eNodeB, which are described in detail below with reference to FIG. 6.

1) When the UE in the idle state desires to establish RRC connection for reasons such as an attempt to make a call, a data transmission attempt, or a response of the eNodeB to paging, the UE transmits an RRC connection request message to the eNodeB first.

2) Upon receiving the RRC connection request message from the UE, the ENB accepts the RRC connection request of the UE when the radio resources are sufficient, and then transmits an RRC connection setup message, which is a response message, to the UE.

3) Upon receiving the RRC connection setup message, the UE transmits an RRC connection setup complete message to the eNodeB. Only when the UE successfully transmits the RRC connection setup message, does the UE establish RRC connection with the eNode B and transition to the RRC connected mode.

Figure 7:
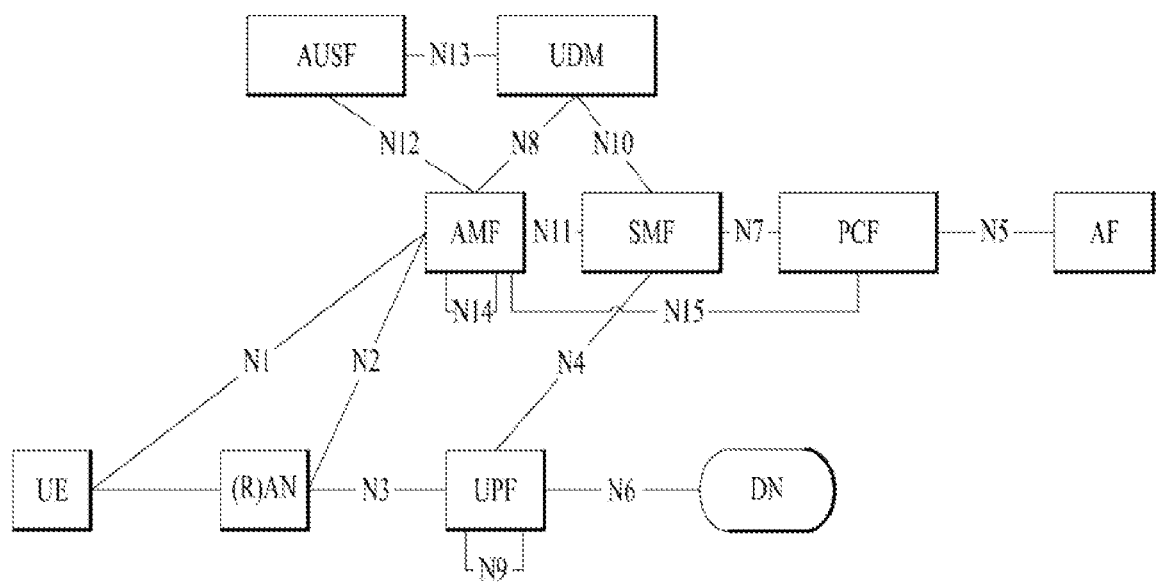
FIG. 7 is a diagram illustrating a 5th generation (5G) system.

The functionality of the MME in the legacy EPC is decomposed into the access and mobility management function (AMF) and the session management function (SMF) in the next generation system (or 5G core network (CN)). The AMF carries out NAS interaction with a UE and mobility management (MM), whereas the SMF carries out session management (SM). The SMF also manages a gateway, user plane function (UPF), which has the user-plane functionality, that is, routes user traffic. It may be considered that the SMF and the UPF implement the control-plane part and user-plane part of the S-GW and the P-GW of the legacy EPC, respectively. To route user traffic, one or more UPFs may exist between a RAN and a data network (DN). That is, for 5G implementation, the legacy EPC may have the configuration illustrated in FIG. 7. In the 5G system, a protocol data unit (PDU) session has been defined as a counterpart to a PDN connection of the legacy EPS. A PDU session refers to association between a UE and a DN, which provides a PDU connectivity service of an Ethernet type or an unstructured type as well as an IP type. The unified data management (UDM) performs the same functionality as the HSS of the EPC, and the policy control function (PCF) performs the same functionality as the policy and charging rules function (PCRF) of the EPC. Obviously, the functionalities may be extended to satisfy the requirements of the 5G system. For details of the architecture, functions, and interfaces of a 5G system, TS 23.501 is conformed to.

The 5G system is being worked on in TS 23.501 and TS 23.502. Accordingly, the technical specifications are conformed to for the 5G system in the present disclosure. Further, TS 38.300 is conformed to for details of NG-RAN-related architecture and contents. As the 5G system also supports non-3GPP access, section 4.2.8 of TS 23.501 describes architecture and network elements for supporting non-3GPP access, and section 4.12 of TS 23.502 describes procedures for supporting non-3GPP access. A representative example of non-3GPP access is WLAN access, which may include both a trusted WLAN and an untrusted WLAN. The AMF of the 5G system performs registration management (RM) and connection management (CM) for non-3GPP access as well as 3GPP access. As such, the same AMF serves a UE for 3GPP access and non-3GPP access belonging to the same PLMN, so that one network function may integrally and efficiently support authentication, mobility management, and session management for UEs registered through two different accesses.

On the other hand, section 5.27 of TR 22.886v16.0.0 describes QoS aspects of advanced driving. Particularly, section 5.27.6 describes scenarios and requirements for supporting automated driving in the following multi-PLMN environment. As a vehicle UE travels, a PLMN may change. In this case, the UE should also be provided with service continuity. In addition, the UE may receive, from the network, information indicating whether QoS for a vehicle to everything (V2X) service (e.g., automated driving) may be guaranteed in a region ahead of the UE on a traveling path, that is, for the region in which the UE is scheduled to travel. Even though the PLMN is changed, such QoS prediction should be provided.

Accordingly, a method of efficiently supporting QoS prediction is proposed as follows in relation to the above description. The proposed method of efficiently supporting QoS prediction in a 3GPP 5G system (a 5G mobile communication system or a next-generation mobile communication system) according to the present disclosure includes a combination of at least one of the following operations/configurations/steps. Particularly, the proposed method of the present disclosure is useful for, but not limited to, a V2X service. In the present disclosure, the term V2X service is used interchangeably with V2X application, V2X message, V2X traffic, V2X data, and so on. In relation to the V2X service, a UE may be any of various UEs such as a pedestrian UE as well as a vehicle UE. In the present disclosure, QoS may be QoS for PC5 communication and/or QoS for Uu communication. In the present disclosure, a PLMN may be interpreted as a mobile network operator (MNO). In addition, unlike an EPS, the name of an interface for device to device (D2D) communication may not be PC5 in the 5G system. In this case, the present disclosure may be understood by applying a newly defined interface name for D2D communication.

Embodiment 1

A server/application function (AF) may transmit a request related to QoS prediction subscription to a network data analytics function (NWDAF), which is a function of transmitting and receiving a signal related to quality of service (QoS) prediction according to an embodiment of the present disclosure (Step 2). The server/AF may receive a notification related to QoS prediction from the NWDAF. That is, when the NWDAF should/need to notify the AF, the NWDAF notifies the AF of an event (Step 3).

The request may include a QoS requirement related to QoS prediction. The QoS requirement may include at least one of a QoS packet delay budget (PDB), a packet error rate (PER), and a guaranteed bit rate (GBR). The request may further include QoS-related threshold level information, and the threshold level information may include a QoS key performance indicator (KPI). More specifically, the request may include: 1) information indicating whether QoS is satisfied for PC5 (this information may include additional QoS-related values to be satisfied, QoS level information, and so on), 2) information indicating whether Uu connectivity or network connectivity is supported, 3) information indicating whether network coverage is possible, and 4) information indicating whether QoS is satisfied for Uu (this information may include additional QoS-related values to be satisfied, QoS level information, and so on). For a V2X service, the AF may be a V2X application server or a V2X control function. The information indicating whether QoS is satisfied may be subdivided to various specific KPI units representing QoS, for example, latency (or PDB), reliability (or PER), GBR, and so on.

Further, the request may include information about a region for QoS prediction. The information about the region may be at least one of route information, geographical area information, or coordinate information about the region. That is, the AF may include the information about the region in the subscription request. The information about the region may include various pieces of information as follows. The information about the region may be interpreted eventually as information about a region requiring QoS prediction.

i) Departure and destination locations of the UE.

ii) Information about the region for which the UE requests QoS prediction.

iii) A current location of the UE and a location at which the requested QoS prediction is terminated.

The information about the region requiring QoS prediction may be coordinate information, address information, road information, tracking area (TA) information, cell ID information, or the like. Particularly regarding ii), there may be a plurality of pieces of such information, thus defining the range of the region. The information about the region applies through the present disclosure. In the above description, a region may be interpreted as a location, a zone, or the like.

Further, the AF may include, in the request, information requesting (immediate) notification of how far from the departure location and/or how long after the departure time the requested event is satisfied. The information may include the distance information and/or the time information. For example, when the AF requests the NWDAF to monitor the event of PC5 QoS satisfaction or non-satisfaction, the AF may further include information requesting notification of whether this is satisfied for 5 km from the departure.

As such, the server according to an embodiment of the present disclosure actively requests by transmitting QoS requirements, region information, threshold information, and so on in relation to QoS prediction, in which the server differs from a conventional server which does not provide QoS, a threshold, and information about a region requiring QoS prediction.

Further, the request may include various pieces of information required for the network to perform QoS prediction. For example, the various pieces of information may include the speed of the UE, information about a movement/departure time when the UE starts to move/leaves at a time other than a UE-requested time, and information about an application requiring QoS prediction (e.g., self-driving, platooning, or the like). When the application is platooning, all UEs participating in platooning or only a leading UE may subscribe to the AF in order to request QoS prediction to the network.

That is, the AF subscribes to a monitoring event notification service of the NWDAF, and the NWDAF receiving the request performs QoS prediction (or QoS satisfaction evaluation) before the UE enters a region to which the UE is expected to move. For information required for the QoS prediction, information collected from various sources such as a UE, an NG-RAN, a network function (NF), and an AF, history information that the NWDAF has, and so on may be used.

Upon receipt of the above-described request, the NWDAF notifies the AF of the event, when the NWDAF should/need to notify the AF. The notification may include information about at least one of a region and a time on which a QoS change occurs. Specifically, the notification message may explicitly or implicitly include at least one of the following pieces of information.

1) Information about an event that occurs.

2) Information about a region covered by the event occurrence/a valid region of the event occurrence.

3) Information about a PLMN covered by the event occurrence/a valid PLMN of the event occurrence.

4) Information about an expected time at which the event starts to occur.

For example, the notification message may indicate "PC5 QoS no longer meets the required level after 3 minutes". In another example, the notification message may indicate "the network connection is not supported 3 km ahead."

If the notification message indicates that the QoS is not satisfied, the notification message may further indicate a QoS level which may be satisfied. For example, a PC5 latency of 10 ms is supposed to be satisfied, and when the PC5 latency requirement is not satisfied, the notification message may further include information indicating that 12 ms may be satisfied.

The notification may be transmitted periodically or when an event satisfies a specific condition (e.g., when a latency is predicted/determined to be equal to or larger than a certain threshold value).

The AF may transmit the request message to the NWDAF after the UE subscribes to the AF for the monitoring event notification service (Step 1). The UE may explicitly or implicitly include information about the requested event in the subscription request, and the event may correspond to the above-described information included in the request. Further, the subscription request may include at least one of the above-described pieces of information included in the request.

Subsequently, the AF notifies the UE of the event, when the NWDAF should/need to notify the AF (Step 4). The AF may provide the UE with information as it is and/or in a modified/processed form based on information received from the NWDAF.

The UE may take an appropriate action based on the notification (Step 5).

Examples of the action are given as follows, and one or more actions may be performed together.

1) The UE stops running the application.

2) The UE unsubscribes from the monitoring event notification service through the AF.

3) As described in the step of notification from the AF, QoS is not satisfied, and when satisfactory QoS is provided, the UE transmits a response indicating whether the QoS is accepted is to the AF.

4) The UE requests the AF to notify, when QoS is satisfied again.

The AF then performs a subsequent operation based on a message received from the UE in the step in which the UE takes an appropriate action (Step 6).

In the above description, section 4.19 (Network Data Analytics) and section 5.2.11 (NWDAF Services) of TS 23.502 may be referred to for the basic operations for transmitting a request by the server and transmitting a notification by the NWDAF. That is, what is defined in TS 23.502 may be extended for the present disclosure. When the NF or AF requires the QoS prediction service, only the steps of transmitting a request by the server and transmitting a notification by the NWDAF may be performed in the above description. For example, when the AF that performs remote driving requires QoS prediction for a region in which the remote driving is performed for a target UE for the remote driving, the AF may take an action which has been described as taken by the UE in the step of taking an appropriate action by the UE.

Now, a description will be given of a case in which the serving PLMN of a UE is changed during QoS prediction, which accompanies a change of a PLMN to which a region for which QoS prediction is performed belongs during QoS prediction.

In a first example, a case in which an AF is operated by a third party will be described.

The AF, which interacts with the NWDAF of PLMN_A, should start to interact with the NWDAF of PLMN_B at some time point. The AF may determine the following based on at least one of information configured for the AF (e.g., configuration information indicating which region is served by which PLMN), information received from an NWDAF, information received from another NF, and information received from a UE. In the NWDAF, information about a region served by a PLMN to which the NWDAF belongs may be configured. Information about a region served by a neighbor PLMN may further be configured in the NWDAF.

a) A time when the interaction between the AF and the NWDAF of PLMN_B should be activated (started). (This may be earlier than a time when the serving PLMN of the UE changes from PLMN_A to PLMN_B, so that QoS for a route on which the UE moves may be predicted.)

b) A time when the interaction between the AF and the NWDAF of PLMN_A is deactivated (terminated). (This may simply be determined to be a time when the UE leaves PLMN_A, that is, a time when PLMN_A is no longer the serving PLMN of the UE.)

The interaction between the AF and the NWDAF may include requesting QoS prediction to the NWDAF and receiving a notification for QoS prediction (described above in the steps of requesting by the server and notifying by the NWDAF). This applies throughout the present disclosure.

The two time points of a) and b) described above may be the same or a) may be earlier than b). Particularly, although the UE is not yet connected to PLMN_B, that is, PLMN_B is not the serving PLMN of the UE, the AF may receive a notification from the NWDAF by performing QoS Prediction with the NWDAF for a region served by PLMN_B. In this case, the AF provides the UE with the information or notification received for PLMN_B through PLMN_A. That is, the UE receives QoS prediction-related information of the region of PLMN_B through PLMN_A which is the serving PLMN (via a PDU session or NAS connection of PLMN_A).

In a second example, an AF may be operated by an operator, that is, the AF may belong to a PLMN. While the AF of PLMN_A interacts with the NWDAF of PLMN_A, the AF of PLMN_B should start to interact with the NWDAF of PLMN_B at some time point. The AF may determine the following based on information about a region requiring QoS prediction by using at least one of information configured for the AF (e.g., configuration information indicating which region is served by which PLMN), information received from an NWDAF, information received from another NF, and information received from a UE. In the NWDAF, information about a region served by the PLMN to which the NWDAF belongs may be configured. Information about a region served by a neighbor PLMN may further be configured in the NWDAF.

A) A time when the AF of PLMN_B should activate (start) interaction with the NWDAF of PLMN_B. (This may be earlier than a time when the serving PLMN of the UE changes from PLMN_A to PLMN_B, so that QoS for a route on which the UE moves may be predicted.)

B) A time when the AF of PLMN_B deactivates (terminates) interaction with the NWDAF of PLMN_B. (This may simply be determined to be a time when the UE leaves PLMN_A, that is, a time when PLMN_A is no longer the serving PLMN of the UE.)

The two time points of A) and B) described above may be the same or A) may be earlier than B).

To enable the AF of PLMN_B to interact with the NWDAF of PLMN_B, a context/information related to the monitoring event should be provided from the AF of MNO_A to the AF of MNO_B. The time point at which the context/information is provided may be earlier than or coincide with the time point of A). When the AF of PLMN_A provides the context/information to the AF of PLMN_B, the AF of PLMN_A may include information about A) or it may be implicitly indicated that providing the context/information itself corresponds to a time at which A) should start.

How to exchange the context/information between the AFs may be determined in various manners as follows. The same or different methods may be used in the case where one of PLMN_A and PLMN_B is the home PLMN of the UE and in the case where the two PLMNs are visited PLMNs of the UE.

I) Provided directly between AFs

II) Provided through a PCF. The PCFs of the two PLMNs may be involved, or only the PCF of one of the two PLMNs may be involved.

III) Provided through the home PLMN of the UE. This may be provided through at least one of an NF to an AF belonging to the home PLMN, such as a UDM, a PCF, an NEF, and a V2X control function.

Particularly, although the UE is not yet connected to PLMN_B, that is, PLMN_B is not the serving PLMN of the UE, the AF of PLMN_B may receive a notification by performing QoS prediction with the NWDAF for a region served by PLMN_B. In this case, the AF of PLMN_B should provide the information or notification to the UE through PLMN_A since the UE is not yet connected to PLMN_B. To this end, the AF of PLMN_B provides the above information/notification to the AF of PLMN_A, and the AF of PLMN_A provides the UE with QoS prediction-related information for the region of PLMN_B through PLMN_A (via a PDU Session or NAS connection of PLMN_A). The information/notification may be provided from the AF of PLMN_B to the AF of PLMN_A based on one of the above-described methods of providing context/information related to a monitoring event.

When the UE moves from PLMN_A to PLMN_B, the AF of PLMN_B may transmit a message indicating that it is the serving AF of the UE. Alternatively/additionally, the AF of PLMN_A may transmit a message indicating that the AF of PLMN_B will be the serving AF.

When the PLMN of the UE is changed, a mechanism for determining a target PLMN may be used in the above description. This mechanism may be used only when there are multiple candidate PLMNs available as a target PLMN, and may be used even when there is only one candidate PLMN. The mechanism may be given as follows.

In the foregoing first example, that is, when an AF is operated by a third party, one of the following methods may be used. The AF provides the UE with a list of PLMNs (including information about one or more PLMNs) serving a region to which the UE is expected to move, and the UE selects one of the PLMNs and indicates the selected PLMN to the AF. The UE may select the PLMN based on configured information (e.g., unconditional selection of the home PLMN, based on a preferred list in the case of a VPLMN, or the like). The AF may perform QoS prediction for the candidate PLMN in advance and provide the UE with information about the QoS prediction. In addition, the AF may select only PLMNs which satisfy QoS and provide the UE with information about the selected PLMNs. Upon receipt of the information, the UE may use the information additionally to determine the target PLMN.

If the UE needs to move out of PLMN_A and select another PLMN, the UE moves to the selected PLMN. The AF selects one of the PLMNs serving the region to which the UE is expected to move and indicates the selected PLMN to the UE. The AF may make the choice based on various pieces of information (provided by a UE, NFs, an NWDAF, and so on). Further, the AF may perform QoS prediction on the candidate PLMN in advance and use information about the QoS prediction.

If the UE needs to move out of PLMN_A and select another PLMN, the UE moves to the PLMN selected and indicated by the AF.

In the foregoing second example, that is, when an AF is operated by an operator, the above description is understood/applied by replacing the AF with the AF of PLMN_A.

The above description has been given with the appreciation that an AF interacts with an NWDAF on a UE basis (which may be interpreted as per UE, UE associated, UE specific, or the like to provide a service to the UE based on the UE's request). However, the interaction may be performed for a plurality of UEs or on a region basis, not on a UE basis. For example, when a plurality of UEs traveling along a lane request QoS prediction to the network, regions for which QoS prediction should be performed for the plurality of UEs are similar or identical, and thus the AF may interact with the NWDAF based on the region for which QoS prediction is to be performed, not for each individual UE. In this case, when the AF receives a notification from the NWDAF, the AF may transmit the notification to all corresponding UEs.

The scenario in which an NWDAF is changed along with change of a PLMN and the scenario in which both an NWDAF and an AF are changed along with change of a PLMN have been described above. The above description is also applicable to a scenario in which although a PLMN is not changed, an NWDAF is changed within the single PLMN and a scenario in which both an NWDAF and an AF are changed within one PLMN. Further, while a function responsible for QoS prediction has been described as an NWDAF, the function may be another NF. In a V2X service, the function may be a V2X control function. Further, transmission and reception between an AF and an NWDAF may be performed through an NEF.

Figure 8:
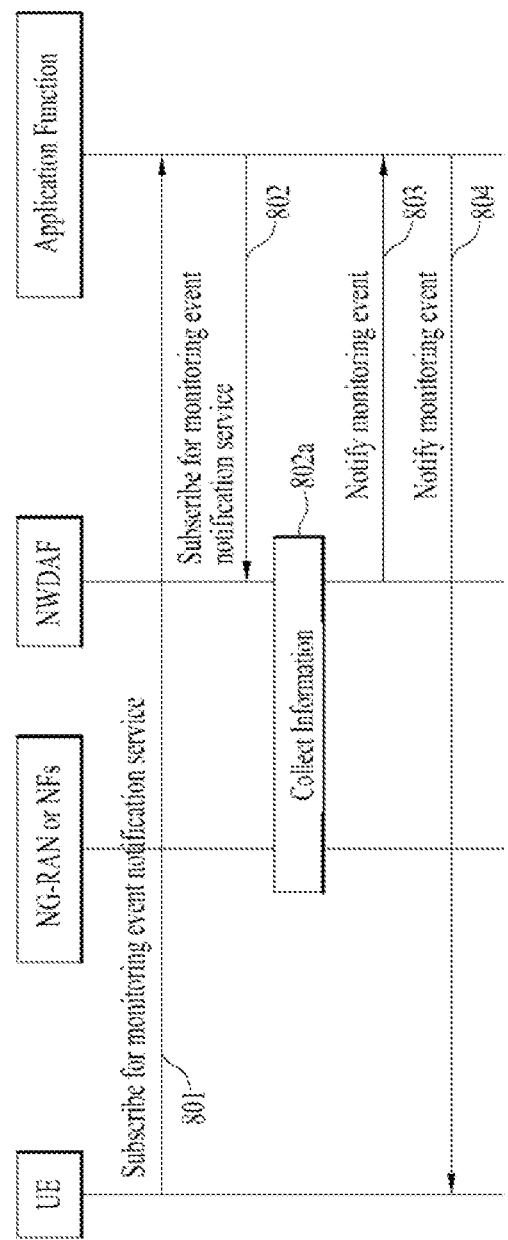
FIG. 8 to FIG. 10 are diagrams for describing a first embodiment of the present disclosure.
Figure 9:
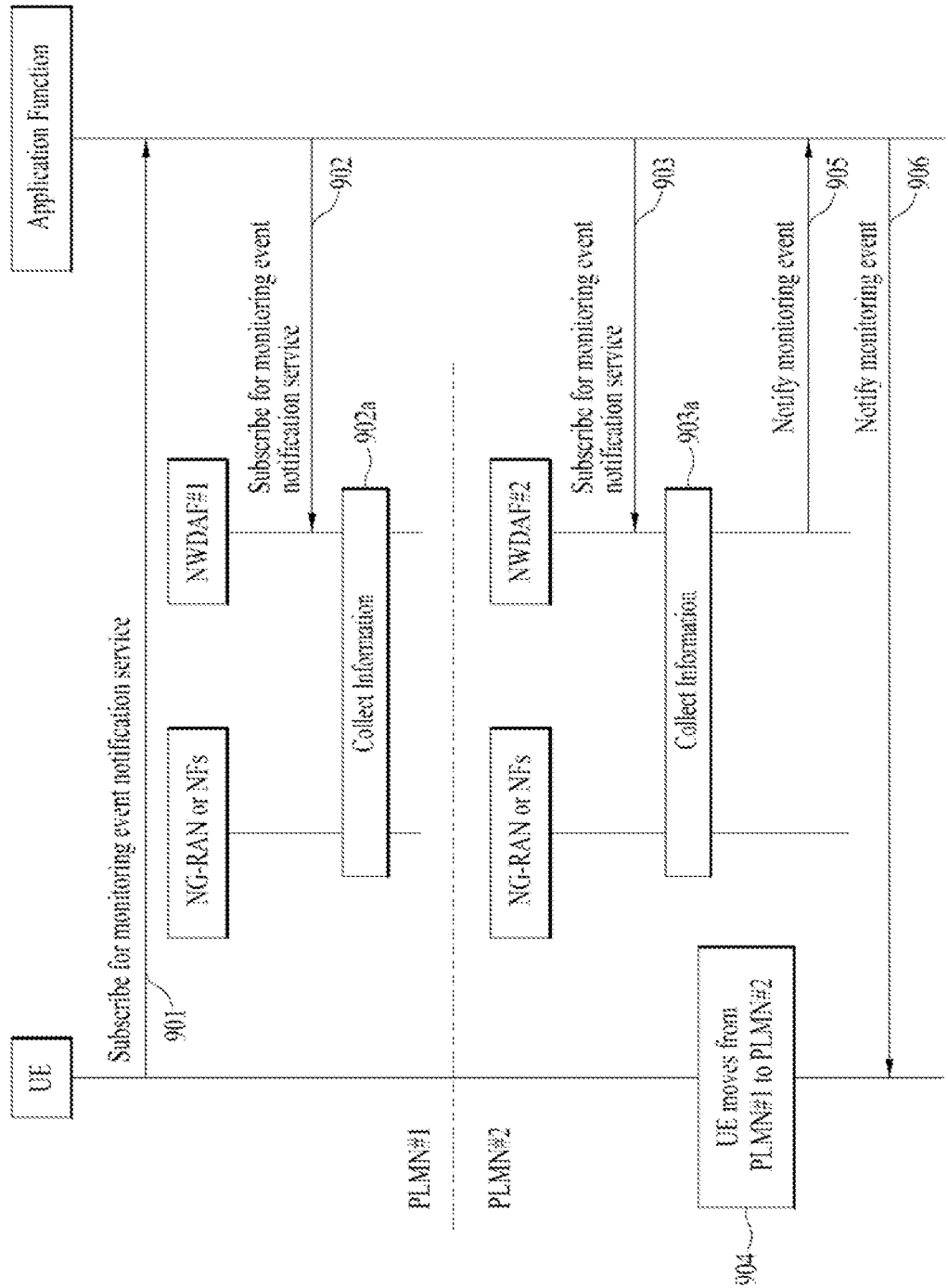
Figure 10:
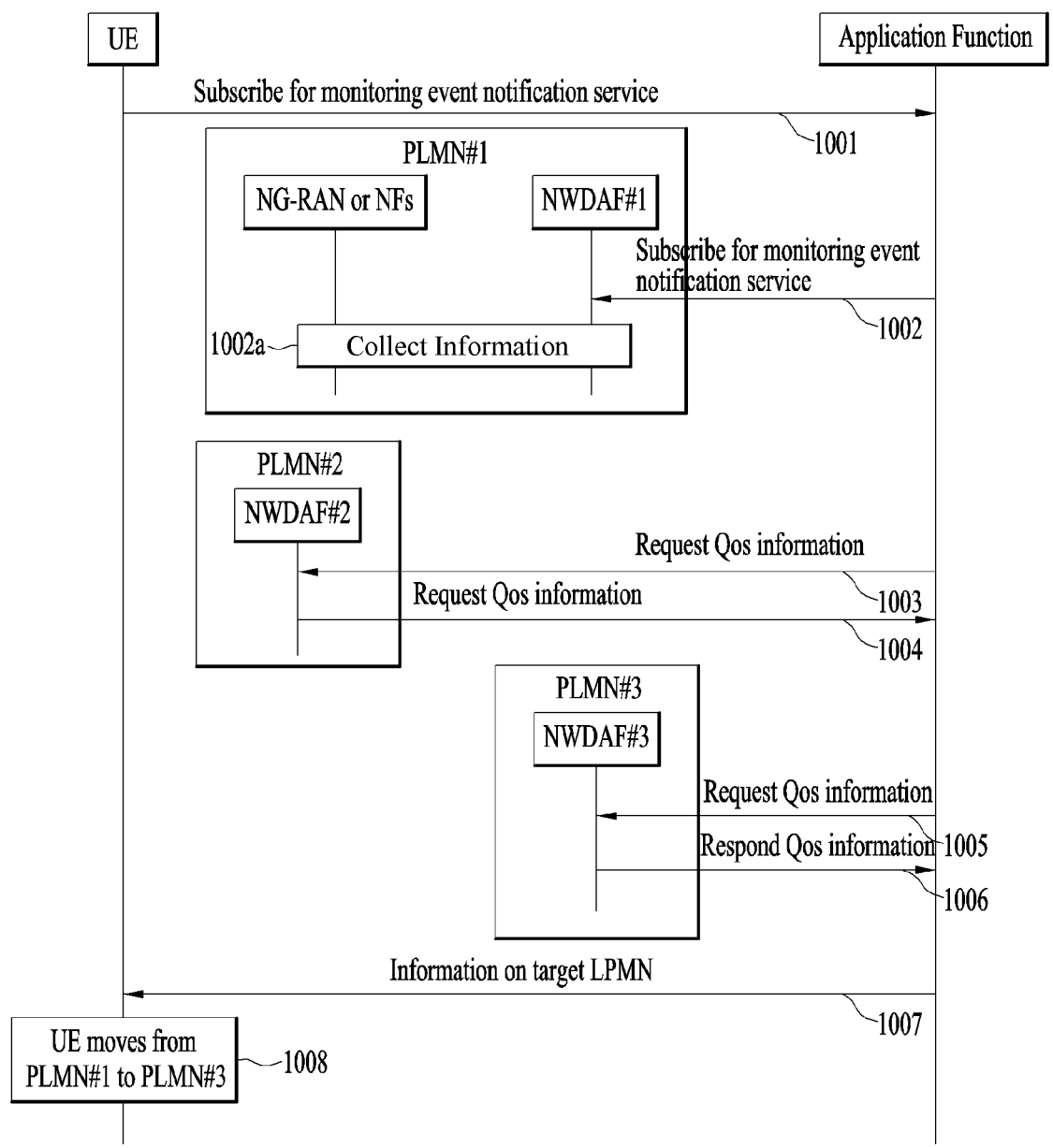

FIGS. 8, 9 and 10 illustrate signaling between network devices for QoS prediction according to embodiments of the present disclosure. The following description is based on the foregoing description. Particularly, the expression "refer to step 1" is written for a part requiring reference.

Referring to FIG. 8, a UE subscribes to an AF for a monitoring event notification service (S801). For details of this operation, refer to step 1 in the foregoing description. The AF is regarded as a V2X application server. Step S801 may be performed by a plurality of UEs. In this case, the AF may interact with an NWDAF for the plurality of UEs (e.g., a platooning unit) or on a region basis. Even when one UE performs step S801, the AF may also interact with the NWDAF on a region basis. The AF may determine a parameter which is to be provided when subscribing to the NWDAF in step S802, based on the unit of interaction with the NWDAF (one UE, a plurality of UEs, or a region).

The AF subscribes to the NWDAF for the monitoring event notification service (S802). For details, refer to step 2 in the foregoing description.

The NWDAF collects information from various sources (e.g., an NG-RAB, an NF, and so on) to perform QoS prediction (or QoS satisfaction evaluation) (S802a). The NWDAF performs QoS prediction (or QoS satisfaction evaluation) before the UE moves to a region to which the UE is expected to move. The NWDAF may use information that it has and information collected from other sources in performing QoS prediction. For details, refer to step 2 in the foregoing description.

In step S803, the NWDAF notifies the AF of an event, when the NWDAF should/need to notify the AF. For details, refer to step 3 in the foregoing description.

In step S804, the AF notifies the UE of the event, when the NWDAF should/need to notify the AF. For details, refer to step 4 in the foregoing description. When the AF has performed step S802 for a plurality of UEs, the AF notifies all of the UEs of the event. Subsequently, step 5 and step 6 in the foregoing description may be performed, when the NWDAF should/need to notify the AF.

FIG. 9 illustrates a procedure of predicting a route and collecting information about a next PLMN by an AF, when a PLMN is changed due to movement of a UE.

In step S901, a UE registers to PLMN #1. The UE then subscribes to an AF for a monitoring event notification service. For details, refer to step 1 as described above. The AF is regarded as a V2X application service. It is assumed that the AF is operated by a third party.

In step S902, the AF subscribes to the monitoring event notification service of the NWDAF of PLMN #1, NWDAF #1. For details, refer to step 2 as described above.

In step S902a, NWDAF #1 collects information from various sources (e.g., an NG-RAB, an NF, and so on) to perform QoS prediction (or QoS satisfaction evaluation). NWDAF #1 performs QoS prediction (or QoS satisfaction evaluation) before the UE moves to a region to which the UE is expected to move. NWDAF #1 may use information that it has and information collected from other sources in performing QoS prediction. For details, refer to step 2 in the foregoing description.

In step S903, the AF starts to interact with the NWDAF, NWDAF #2 of a PLMN to which the UE will move, PLMN #2 in consideration of a route in which the UE moves. For an operation of the AF in this scenario in which a PLMN to which a region subjected to QoS prediction belongs changes during the QoS prediction, the foregoing description will be referred to. For step S903a, step S902a is referred to.

In step S904, the UE moves from PLMN #1 to PLMN #2, and registers to PLMN #2. The UE may notify the AF that the PLMN has been changed.

In step S905, NWDAF #2 notifies the AF of an event, when the NWDAF should/need to notify the AF. For details, refer to step 3 in the foregoing description.

In step S906, the AF notifies the UE of the event, when the NWDAF should/need to notify the AF. For details, refer to step 4 in the foregoing description. Subsequently, step 5 and step 6 in the foregoing description may be performed, when the NWDAF should/need to notify the AF.

FIG. 10 also relates to a case in which a PLMN is changed, particularly to a method of determining candidate PLMNs capable of guaranteeing QoS in a query procedure, when there are a plurality of PLMNs on a route.

Specifically, referring to FIG. 10, a UE registers to PLMN #1 in step S1001. The UE then subscribes to an AF for a monitoring event notification service. For details, refer to step 1 as described above. The AF is regarded as a V2X application service. It is assumed that the AF is operated by a third party.

In step S1002, the AF subscribes to the monitoring event notification service of the NWDAF, NWDAF #1 of PLMN #1. For details, refer to step 2 as described above.

In step S1002a, NWDAF #1 collects information from various sources (e.g., an NG-RAB, an NF, and so on) to perform QoS prediction (or QoS satisfaction evaluation). NWDAF #1 performs QoS prediction (or QoS satisfaction evaluation) before the UE moves to a region to which the UE is expected to move. NWDAF #1 may use information that it has and information collected from other sources in performing QoS prediction. For details, refer to step 2 in the foregoing description. Continuously, the AF requests QoS prediction information to the NWDAF, NWDAF #2 of a target PLMN, PLMN #2 to which the UE will move in consideration of the route in which the UE moves in step S1003.

In step S1004, NWDAF #2 provides QoS information to the AF. While not shown, NWDAF #2 may collect information from various sources (e.g., an NG-RAN and an NF) to provide the QoS information.

In step S1005, the AF requests QoS prediction information to the NWDAF, NWDAF #3 of another target PLMN, PLMN #3 to which the UE will move in consideration of the route in which the UE moves.

In step S1006, NWDAF #3 provides QoS information to the AF. While not shown, NWDAF #3 may collect information from various sources (e.g., an NG-RAN and an NF) to provide the QoS information. For steps S1003 to S1006, the foregoing description is referred to. Subsequently, the AF selects one of PLMNs serving the region to which the UE is expected to move, that is, PLMN #2 and PLMN #3 and provides information about the selected PLMN to the UE in step S1007. The AF may use various pieces of information including the QoS information acquired in steps S1004 and S1006. It is assumed that the AF selects PLMN #3 capable of satisfying QoS and indicates PLMN #3 to the UE.

In step S1008, the UE moves from PLMN #1 to PLMN #3.

After selecting PLMN #3 in step S1007, the AF may subscribe to the monitoring event notification service of NWDAF #3.

Embodiment 2

Hereinafter, it will be described how the contents described in Embodiment 1 as described above may be actually implemented in a mobile terminal device. Although all of the contents of Embodiment 1 as described above may not describe terminal device based implementations, device based implementations that may be sufficiently predicted by a person skilled in the art from the contents described in Embodiment 1 based on a specific example mainly described below may be included in the present embodiment. Hereinafter, first, a mobile terminal device to which the present embodiment may be applied and a configuration thereof will be described, and then detailed implementations will be described.

A mobile terminal device may include mobile phones, smart phones, laptop computers, terminal devices for digital broadcasting, personal digital assistants (PDAs), portable multimedia players (PMPs), navigation devices, slate PCs, tablet PCs, ultrabook, wearable devices (e.g., a watch-type terminal device (smartwatch), a glass-type terminal device (smart glass), a head mounted display (HMD)), and the like. Furthermore, the mobile terminal device may be used for controlling at least one device in an IoT (Internet of Things) environment or a smart greenhouse.

However, those skilled in the art may easily understand that the configuration according to the embodiment as described in the present specification may be applied not only to the mobile terminal device, but also to a fixed terminal device such as a digital TV, a desktop computer, and a digital signage.

Figure 11:
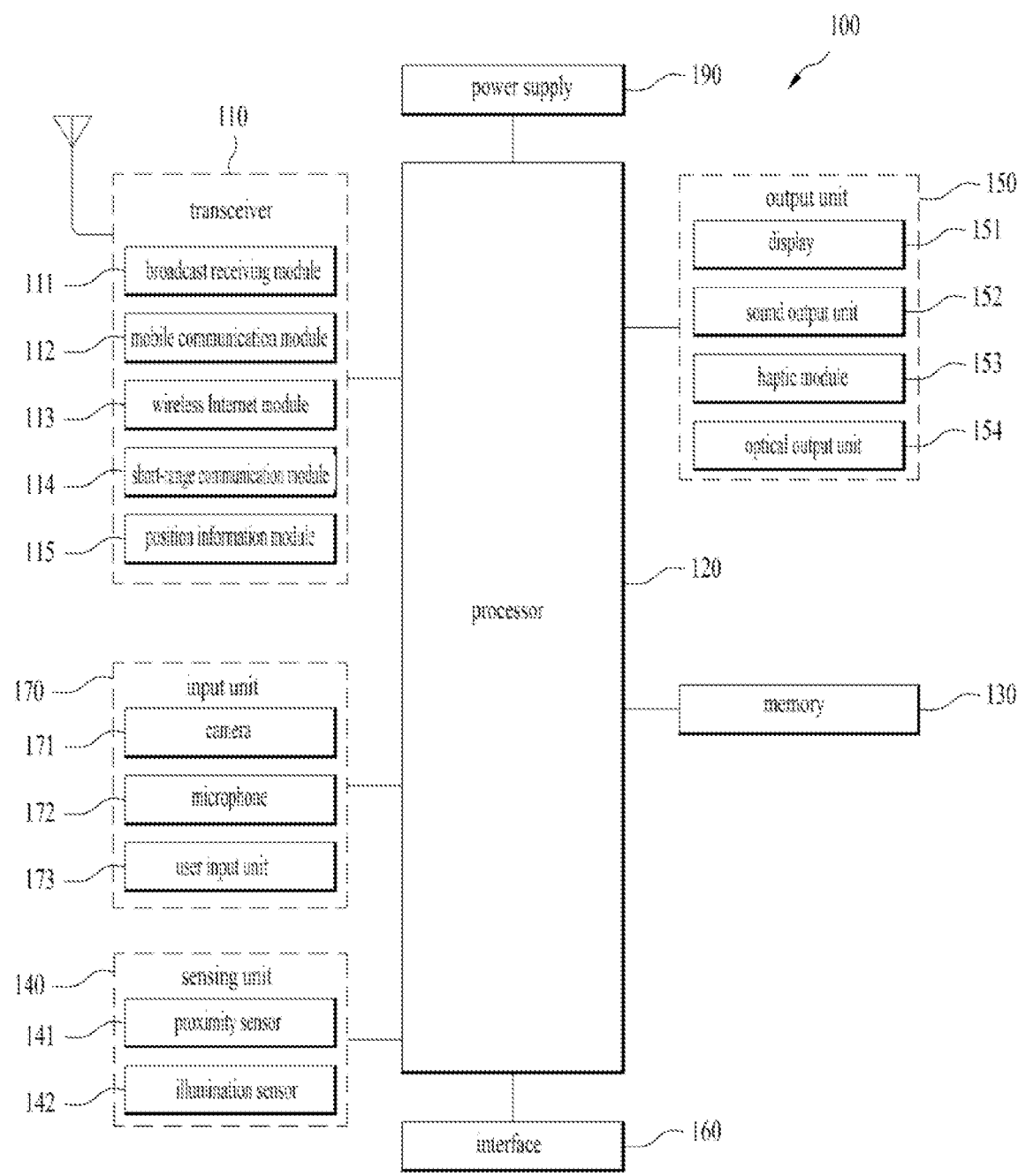
FIG. 11 is a block diagram for describing a mobile terminal device related to the present disclosure.

FIG. 11 is a block diagram for describing a mobile terminal device related to the present disclosure.

A mobile terminal device 100 may include a transceiver 110, a processor 120, a memory 130, a sensing unit 140, an output unit 150, an interface 160, an input unit 170, and a power supply 190. The components shown in FIG. 11 are not essential for implementing the mobile terminal device, and thus the mobile terminal device described in the present disclosure may have more or fewer components than those listed above.

More specifically, among the components, the transceiver 110 may include at least one module to enable wireless communication between the mobile terminal device 100 and a wireless communication system, between the mobile terminal device 100 and another mobile terminal device 100, or between the mobile terminal device 100 and an external server. Further, the transceiver 110 may include an at least one module for connecting the mobile terminal device 100 to at least one network.

The transceiver 110 may include at least one of a broadcast receiving module 111, a mobile communication module 112, a wireless Internet module 113, a short-range communication module 114, and a position information module 115.

The input unit 170 includes a camera 171 or a video input unit for inputting a video signal, a microphone 172 or an audio input unit for inputting an audio signal, and a user input unit 173 for receiving information from a user. For example, the user input unit may include a touch key, a push key (mechanical key), etc. Voice data or image data collected by the input unit 170 may be analyzed and processed into a user's control command.

The sensing unit 140 may include at least one sensor for sensing at least one of information within the mobile terminal device, information on environments surrounding the mobile terminal device, and user information. For example, the sensing unit 140 may include at least one of a proximity sensor 141, an illumination sensor 142, a touch sensor, an acceleration sensor, a magnetic sensor, a gravity sensor (G-sensor), a gyroscope sensor, a motion sensor, a RGB sensor, an infrared sensor (IR sensor), a finger scan sensor, an ultrasonic sensor, an optical sensor (e.g., a camera (see 171)), a microphone (see 172), a battery gauge, an environmental sensor (e.g., a barometer, a hygrometer, a thermometer, a radiation detection sensor, a heat detection sensor, a gas detection sensor, etc.), and a chemical sensor (e.g., an electronic nose, a healthcare sensor, a biometric sensor, etc.). In one example, the mobile terminal device disclosed in the present specification may use a combination of pieces of information sensed by at least two of these sensors.

The output unit 150 is configured for generating an output related to visual, auditory or tactile sense, and may include at least one of a display 151, a sound output unit 152, a haptic module 153, and an optical output unit 154. The display 151 is combined with a touch sensor to form a stack structure or is integral therewith, thereby implementing a touch screen. The touch screen may function as a user input unit 173 that provides an input interface between the mobile terminal device 100 and a user, and at the same time, may provide an output interface between the mobile terminal device 100 and the user.

The interface 160 serves as a channel between the mobile terminal device 100 and various types of external devices connected to the mobile terminal device 100. This interface 160 may include at least one of a wired/wireless headset port, an external charger port, a wired/wireless data port, a memory card port, a port for connecting a device equipped with an identification module, an audio input/output (I/O) port, a video input/output (I/O) port, and an earphone port.

In response to connection of the external device to the interface 160, appropriate control related to the connected external device may be performed in the mobile terminal device 100.

Further, the memory 130 stores therein data for supporting various functions of the mobile terminal device 100. The memory 130 may store therein a plurality of application programs (or applications) executed on the mobile terminal device 100, data and instructions for operations of the mobile terminal device 100. At least some of these application programs may be downloaded from an external server via wireless communication. In addition, at least some of these application programs may exist on the mobile terminal device 100 at the time of the shipment thereof for basic functions (e.g., incoming calls, outgoing functions, message reception, and outgoing functions) of the mobile terminal device 100. In one example, the application program may be stored in the memory 130 and may be installed on the mobile terminal device 100 and may be executed by the processor 120 to perform an operation (or function) of the mobile terminal device.

In addition to the operation related to the application program, the processor 120 generally controls overall operations of the mobile terminal device 100. The processor 120 may process or provide appropriate information or functions to a user by processing signals, data, information, etc. input or output through the above-described components or by executing the application program stored in the memory 130.

Further, in order to execute the application program stored in the memory 130, the processor 120 may control at least some of the components discussed with reference to FIG. 11. Further, in order to execute the application program, the processor 120 may operate a combination of at least two of the components included in the mobile terminal device 100.

The power supply unit 190 receives external power or internal power under the control of the processor 120 and supplies the received power to each of the components included in the mobile terminal device 100. This power supply unit 190 includes a battery. The battery may be a built-in battery or a replaceable battery.

At least some of the components thereof may operate in cooperation with each other to implement operations, controls, or control methods of the mobile terminal device according to various embodiments as described below. Further, the operations, the controls, or the control methods of the mobile terminal device may be implemented on the mobile terminal device via execution of at least one application program stored in the memory 130.

Hereinafter, before referring to various embodiments implemented in the mobile terminal device 100 as described above, the above-listed components will be described in more detail with reference to FIG. 11.

First, referring to the transceiver 110, the broadcast receiving module 111 of the transceiver 110 receives a broadcast signal and/or broadcast-related information from an external broadcast management server over a broadcast channel. The broadcast channel may include a satellite channel and a terrestrial channel. Two or more broadcast receiving modules may be included in the mobile terminal device 100 for simultaneous broadcast reception or broadcast channel switching for at least two broadcast channels.

The mobile communication module 112 may transmit and receive wireless signals with at least one of a base station, an external terminal device, and a server over a mobile communication network constructed in accordance with technical standards or communication schemes for mobile communication (for example, GSM (Global System for Mobile communication), CDMA (Code Division Multi Access), CDMA2000 (Code Division Multi Access 2000)), EV-DO (Enhanced Voice-Data Optimized or Enhanced Voice-Data Only), WCDMA (Wideband CDMA), HSDPA (High Speed Downlink Packet Access), HSUPA (High Speed Uplink Packet Access), LTE (Long Term Evolution), LTE-A (Long Term Evolution-Advanced), 3GPP NR (New Radio access technology), etc.).

The wireless signal may include a voice call signal, a video call signal, or various types of data according to transmission/reception of text/multimedia messages.

The wireless Internet module 113 refers to a module for wireless Internet access, and may be embedded in or external to the mobile terminal device 100. The wireless Internet module 113 may be configured to transmit and receive wireless signals over a communication network according to wireless Internet technologies.

Examples of the wireless Internet technologies may include WLAN (Wireless LAN), Wi-Fi (Wireless-Fidelity), Wi-Fi (Wireless Fidelity) Direct, DLNA (Digital Living Network Alliance), WiBro (Wireless Broadband), WiMAX (World Interoperability for Microwave Access), HSDPA (High Speed Downlink Packet Access), HSUPA (High Speed Uplink Packet Access), LTE (Long Term Evolution), LTE-A (Long Term Evolution-Advanced), 3GPP NR, etc. The wireless Internet module 113 transmits and receives data according to at least one wireless Internet technology in a range including Internet technologies not listed above.

Under the fact that the wireless Internet access under WiBro, HSDPA, HSUPA, GSM, CDMA, WCDMA, LTE, LTE-A, 3GPP NR, etc. is achieved over the mobile communication network, the wireless Internet module 113 which perform the wireless Internet access over the mobile communication network may be considered as a type of the mobile communication module 112.

The short range communication module 114 is configured for short range communication, and may support the short range communication using at least one of Bluetooth™, Radio Frequency Identification (RFID), Infrared Data Association (IrDA), Ultra Wideband (UWB), ZigBee, and NFC (Near Field Communication), Wi-Fi (Wireless-Fidelity), Wi-Fi Direct, and Wireless USB (Wireless Universal Serial Bus) technologies. The short-range communication module 114 may support the wireless communication between the mobile terminal device 100 and a wireless communication system, between the mobile terminal device 100 and another mobile terminal device 100, or between the mobile terminal device 100 and a network in which another mobile terminal device 100 (or an external server) is located, over a wireless area network. The wireless area network may be a wireless personal area network.

In this connection, another mobile terminal device 100 may be a wearable device capable of exchanging data with (or being associated with) the mobile terminal device 100 according to the present disclosure. For example, the wearable device may include a smartwatch, a smart glass, a neckband, and a head mounted display (HMD). The short-range communication module 114 may detect (or recognize) the wearable device capable of communicating with the mobile terminal device 100 around the mobile terminal device 100. Furthermore, when the detected wearable device has been certified to communicate with the mobile terminal device 100 according to the present disclosure, the processor 120 transmits at least a portion of data processed by the mobile terminal device 100 to the wearable device via the short-range communication module 114. Accordingly, a user of the wearable device may use the data processed by the mobile terminal device 100 using the wearable device. For example, when a call is received by the mobile terminal device 100, the user performs phone based communication via the wearable device. Alternatively, when a message is received by the mobile terminal device 100, the user may check the received message via the wearable device.

Further, screen mirroring with a TV located in a house or a display inside a vehicle may be performed using the short-range communication module 114. For example, the corresponding function (mirroring) may be performed based on the MirrorLink or Miracast standard. Further, the user may directly control the TV or the display inside the vehicle using the mobile terminal device 100.

The position information module 115 refers to a module for obtaining a position (or current position) of the mobile terminal device, and representative examples thereof may include a GPS (Global Positioning System) module or a WiFi (Wireless Fidelity) module. For example, when the mobile terminal device uses the GPS module, the position of the mobile terminal device may be obtained using a signal sent from a GPS satellite. In another example, when the mobile terminal device uses a Wi-Fi module, the position of the mobile terminal device may be obtained based on information of a wireless access point (AP) that transmits or receives a wireless signal to or from the Wi-Fi module. Alternatively or additionally, when necessary, the position information module 115 may perform a function of one of other modules of the transceiver 110 in order to obtain data on the position of the mobile terminal device. The position information module 115 may refer to a module used to obtain the position (or current position) of the mobile terminal device, and is not limited to a module that directly calculates or obtains the position of the mobile terminal device.

The broadcast receiving module 111, the mobile communication module 112, the short-range communication module 114, and the position information module 115 may be implemented as individual modules that perform corresponding functions, respectively. Alternatively, functions corresponding to two or more of the broadcast receiving module 111, the mobile communication module 112, the short-range communication module 114, and the position information module 115 may be implemented by a single module.

Next, the input unit 170 is configured for inputting image information (or signal), audio information (or signal), data, or information input from a user. For input of the image information, the mobile terminal device 100 may include one or a plurality of cameras 171. The camera 171 processes an image frame such as a still image or a moving picture obtained from an image sensor in a video call mode or a photographing mode. The processed image frame may be displayed on the display 151 or stored in the memory 130. In one example, a plurality of cameras 171 provided in the mobile terminal device 100 may be arranged to form a matrix structure. Using the cameras 171 forming the matrix structure as described above, a plurality of image information having various angles or focal points may be input to the mobile terminal device 100. Further, the plurality of cameras 171 may be arranged in a stereo structure to obtain a left image and a right image for realizing a 3D image.

The microphone 172 may convert an external sound signal into electrical voice data. The converted voice data may be variously utilized according to a function (or an application program being executed) being executed in the mobile terminal device 100. In one example, in the microphone 172, various noise removal algorithms may be implemented for removing noise generated in a process of receiving the external sound signal.

The user input unit 173 is configured for receiving information from the user. When information is input to the mobile terminal device through the user input unit 173, the processor 120 may control the operation of the mobile terminal device 100 to correspond to the input information. The user input unit 173 may include mechanical input means (or a mechanical key; for example, a button, a dome switch, a jog wheel, a jog switch, etc. located on a front, rear or side of the mobile terminal device 100) and touch-type input means. In an example, the touch input means may include a virtual key, a soft key, or a visual key displayed on a touch screen via software processing, or a touch key disposed on a region other than the touch screen. In one example, the virtual key or the visual key may be displayed on the touch screen while having various forms. For example, the virtual key or the visual key may be composed of graphic, text, icon, video, or a combination thereof.

In one example, the sensing unit 140 senses at least one of information in the mobile terminal device, information on the environment surrounding the mobile terminal device, and user information and may generate a sensed signal corresponding thereto. The processor 120 may control execution or operation of the mobile terminal device 100 based on the sensed signal, or may perform data processing, function, or operation related to the application program installed in the mobile terminal device 100, based on the sensed signal. Representative sensors among various sensors that may be included in the sensing unit 140 will be described in more detail.

First, a proximity sensor 141 refers to a sensor that detects presence or absence of an object approaching a predetermined detection target face or an object existing in the vicinity thereof by using a force of an electromagnetic field or infrared rays without mechanical contact. The proximity sensor 141 may be disposed in an inner region of the mobile terminal device surrounded by the touch screen described above or near the touch screen.

Examples of the proximity sensor 141 may include a transmission type photoelectric sensor, a direct reflection type photoelectric sensor, a mirror reflection type photoelectric sensor, a high frequency oscillation type proximity sensor, a capacitive type proximity sensor, a magnetic type proximity sensor, an infrared proximity sensor, and the like. When the touch screen is a capacitive type touch screen, the proximity sensor 141 may be configured to detect proximity of a conductive object based on a change in the electric field according to the proximity of the conductive object thereto. In this case, the touch screen (or touch sensor) itself may be classified as the proximity sensor.

In one example, for convenience of description, an action of allowing the object to be recognized as being positioned above the touch screen while the object non-contacts the touch screen may be referred to as "proximity touch". An action of actually contacting the object with the touch screen may be referred to as "contact touch". A position of the object at which the object proximity touches the touch screen means a position of the object in a direction normal to the touch screen when the object proximity touches the touch screen. The proximity sensor 141 may detect the proximity touch and a proximity touch pattern (e.g., a proximity touch distance, a proximity touch direction, a proximity touch speed, a proximity touch time, a proximity touch position, a proximity touch movement state, etc.). In one example, the processor 120 processes data (or information) corresponding to the proximity touch operation and the proximity touch pattern sensed via the proximity sensor 141. Furthermore, visual information corresponding to the processed data may be output on the touch screen. Further, the processor 120 may control the mobile terminal device 100 so that an operation or data (or information) as processed may vary based on whether a touch relative to the same point on the touch screen is the proximity touch or the contact touch.

The touch sensor detects a touch (or touch input) applied to the touch screen (or display 151) using at least one of various touch sensing schemes such as resistive, capacitive, infrared, ultrasonic, and magnetic field based touch sensing schemes.

In an example, the touch sensor may be configured to convert a change in a pressure applied to a specific portion of the touch screen or a capacitance generated at a specific portion thereof into an electrical input signal. The touch sensor may be configured to detect a position, an area, a pressure, a capacitance, and the like at which the object touching the touch screen touches the touch sensor. In this connection, the object may refer to an object that touches the touch sensor, and may be, for example, a finger, a touch pen, a stylus pen, or a pointer.

When the touch input to the touch sensor is present, a signal(s) corresponding thereto is transmitted to a touch controller. The touch controller processes the signal(s) and then transmits corresponding data thereto to the processor 120. As a result, the processor 120 may know which region of the display 151 which the object touches. In this connection, the touch controller may be a separate component from the processor 120, or may be the processor 120 itself In one example, the processor 120 may perform different controls or the same control based on a type of the object touching the touch screen (or a touch key provided in addition to the touch screen). Whether to perform different controls or the same control based on the type of the touching object may be determined based on a current operating state of the mobile terminal device 100 or a type of an application program being executed.

In one example, the touch sensor and the proximity sensor as described above may sense various types of touches independently or in combination with each other. The various types of touches may include a short (or tap) touch, a long touch, a multi touch, a drag touch, a flick touch, a pinch-in touch, a pinch-out touch, a swipe touch, a hovering touch, etc.

The ultrasonic sensor may recognize position information of a sensing target using ultrasonic waves. In one example, the processor 120 may calculate a location of a wave generation source using information sensed from an optical sensor and a plurality of ultrasonic sensors. The location of the wave generation source may be calculated using the fact that light moves much faster than the ultrasonic wave moves, that is, a time duration for which the light reaches the optical sensor is much smaller than a time duration for which the ultrasonic wave reaches the ultrasonic sensor. More specifically, the location of the wave generation source may be calculated using a difference between the time duration for which the light reaches the optical sensor and the time duration for which the ultrasonic wave reaches the ultrasonic sensor.

In one example, the camera 171 as a component of the input unit 170 includes at least one of a camera sensor (e.g., CCD, CMOS, etc.), a photo sensor (or image sensor), and a laser sensor.

The camera 171 and the laser sensor are combined with each other to detect a touch of the sensing target relative to a 3D stereoscopic image. The photosensor may be stacked on a display device, and the photosensor may be configured to scan a motion of the sensing target close to the touch screen. More specifically, the phot sensor has photo diodes and transistors (TR) arranged in a row/column and thus scans an object placed on the photo sensor using an electrical signal that changes according to an amount of light applied to the photo diodes. That is, the photo sensor may calculate coordinate of the object to be detected according to change in an amount of the light, and may obtain the position information of the sensing target based on the change.

The display 151 displays (outputs) information processed by the mobile terminal device 100. For example, the display 151 may display execution screen information of an application program executed in the mobile terminal device 100, or UI (User Interface) and GUI (Graphic User Interface) information based on the execution screen information.

Further, the display 151 may be embodied as a three-dimensional display that displays a three-dimensional image.

A three-dimensional display scheme such as a stereoscopic scheme (glasses based scheme), an auto stereoscopic scheme (no glasses scheme), and a projection scheme (holographic scheme) may be applied to the stereoscopic display or three-dimensional display.

The sound output unit 152 may output audio data received from the transceiver 110 or stored in the memory 130 in a call signal reception mode, a call mode or a recording mode, a voice recognition mode, a broadcast reception mode, and the like. The sound output unit 152 outputs sound signals related to functions (e.g., call signal reception sound, message reception sound, etc.) performed in the mobile terminal device 100. The sound output unit 152 may include a receiver, a speaker, and a buzzer.

The haptic module 153 generates various tactile effects that a user may feel. A typical example of the tactile effect generated by the haptic module 153 may be vibration. An intensity and a pattern of the vibration generated by the haptic module 153 may be controlled based on a user selection or a processor setting. For example, the haptic module 153 may synthesize and output different vibrations or output the different vibrations sequentially.

In addition to the vibration, the haptic module 153 may generate various tactile effects such as an arrangement of pins that move in a normal manner with respect to a contact skin surface, a blowing force or a suction force of air through an injection hole or an intake hole, a rubbing against the skin surface, a contact with an electrode, and electrostatic force, and feeling of cooling and warming the skin using an endothermic element or an exothermic element.

The haptic module 153 may deliver the tactile effect to the skin via direct contact, or may be implemented so that a user may feel the tactile effect via muscle sensations such as a finger or an arm. Two or more haptic modules 153 may be provided depending on a configuration of the mobile terminal device 100.

The optical output unit 154 outputs a signal for notifying occurrence of an event using light from a light source of the mobile terminal device 100. Examples of the event occurring in the mobile terminal device 100 may include message reception, call signal reception, missed call, alarm, schedule notification, email reception, and information reception through an application.

The signal output from the optical output unit 154 is implemented when the mobile terminal device emits a single color or multiple colors of light in a front or rear direction. The signal output may be terminated when the mobile terminal device detects that the user confirms the event.

The interface 160 serves as a channel between the mobile terminal device 100 and all external devices connected to the mobile terminal device 100. The interface 160 receives data from the external device or receives power and delivers the power to each of the components inside the mobile terminal device 100, or transmits data inside the mobile terminal device 100 to the external device. For example, a wired/wireless headset port, an external charger port, a wired/wireless data port, a memory card port, a port for connecting a device equipped with an identification module, an audio input/output (I/O) port, a video input/output (I/O) port, an earphone port, and the like may be included in the interface 160.

In one example, the identification module may refer to a chip that stores various types of information for authenticating a right to use the mobile terminal device 100, and may include a user identification module (UIM), a subscriber identity module (SIM), and an universal subscriber identity module (USIM). The device equipped with the identification module (hereinafter, 'identification device') may be manufactured in a form of a smart card. Accordingly, the identification device may be connected to the terminal device 100 via the interface 160.

Further, the interface 160 may act as a channel through which power from an external cradle is supplied to the mobile terminal device 100 when the mobile terminal device 100 is connected to the external cradle. Alternatively, the interface 160 may act as a channel through which various command signals input from the cradle by the user is delivered to the mobile terminal device 100. Various command signals or power input from the cradle may act as signals for recognizing whether the mobile terminal device 100 is correctly mounted on the cradle.

The memory 130 may store therein a program for the operation of the processor 120. Input/output data (e.g., phonebook, message, still image, video, etc.) may be temporarily stored therein. The memory 130 may store therein data on vibrations and sounds of various patterns output when a touch is input onto the touch screen.

The memory 130 may include at least one storage medium of a flash memory type memory, a hard disk type memory, a solid state disk type (SDD type) memory, a multimedia card micro type memory (e.g. SD or XD memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disc. The mobile terminal device 100 may operate in connection with a web storage that performs a storage function of the memory 130 over the Internet.

In one example, as described above, the processor 120 controls the operation related to the application program and the overall operations of the mobile terminal device 100. For example, when a state of the mobile terminal device satisfies a preset condition, the processor 120 may activate or deactivate a locked state in which input of a user's control command for the applications is restricted.

Further, the processor 120 performs controls and processing related to voice calls, data communication, video calls, etc., or performs pattern recognition processing capable of recognizing handwriting input or drawing input onto the touch screen as characters and images. Furthermore, the processor 120 may control one or a combination of a plurality of components as described above in order to implement various embodiments as described below on the mobile terminal device 100 according to the present disclosure.

The power supply 190 receives external power and internal power under the control of the processor 120 and supplies power necessary for the operation of each of the components. The power supply 190 includes a battery. The battery may be a built-in battery as rechargeable or may be detachably coupled to a terminal device body for charging.

Further, the power supply 190 may have a connection port. The connection port may be embodied as an example of the interface 160 to which an external charger that supplies power for charging the battery is electrically connected.

In another example, the power supply 190 may be configured to charge the battery in a wireless manner without using the connection port. In this case, the power supply 190 may receive power from an external wireless power transmission device using at least one of an inductive coupling scheme based on a magnetic resonance phenomenon or a magnetic resonance coupling scheme based on an electromagnetic resonance phenomenon.

In one example, following various embodiments may be implemented in a recording medium that may be read by a computer or a similar device using, for example, software, hardware, or a combination thereof.

In one example, the mobile terminal device may be extended to a wearable device that may be worn on a user body beyond a device that the user holds by the hand. Such wearable devices include smart watches, smart glasses, and head mounted displays (HMD). Hereinafter, examples of the mobile terminal device extended to the wearable devices will be described.

The wearable device may be configured to exchange data with (or to be associated with) another mobile terminal device 100. The short-range communication module 114 may detect (or recognize) a wearable device capable of communicating with and disposed around the mobile terminal device 100. Furthermore, when the detected wearable device is authenticated to communicate with the mobile terminal device 100, the processor 120 transfers at least a portion of data processed by the mobile terminal device 100 to the wearable device through the short-range communication module 114. Accordingly, the user may use the data processed by the mobile terminal device 100 via the wearable device. For example, when a call is received by the mobile terminal device 100, a phone call may be performed via the wearable device. Alternatively, when a message is received by the mobile terminal device 100, the received message may be identified using the wearable device.

Hereinafter, how various embodiments of the present disclosure are implemented in the mobile terminal device will be described in detail. Hereinafter, the terminal device or the mobile terminal device may a fixed or removable terminal device mounted inside a vehicle, a portable terminal device, or a combination thereof.

The mobile terminal device according to an embodiment of the present disclosure may include a display that displays a travel path and whether quality of service (QoS) are satisfied, and a controller that controls the display. In this connection, whether the QoS is satisfied is based on information received from a server that has received a notification related to QoS prediction from a Network Data Analytics Function (NWDAF). In this connection, the notification related to the QoS prediction is due to a request related to QoS prediction subscription transmitted from the server to the NWDAF. The request may include QoS requirements for the QoS prediction.

Regarding the above content, an operation in the mobile terminal device will be described with reference to FIG. 12 to FIG. 14. The contents as described below do not necessarily have to be performed in an entire manner, but may be performed in a partial/combined manner.

Figure 12:
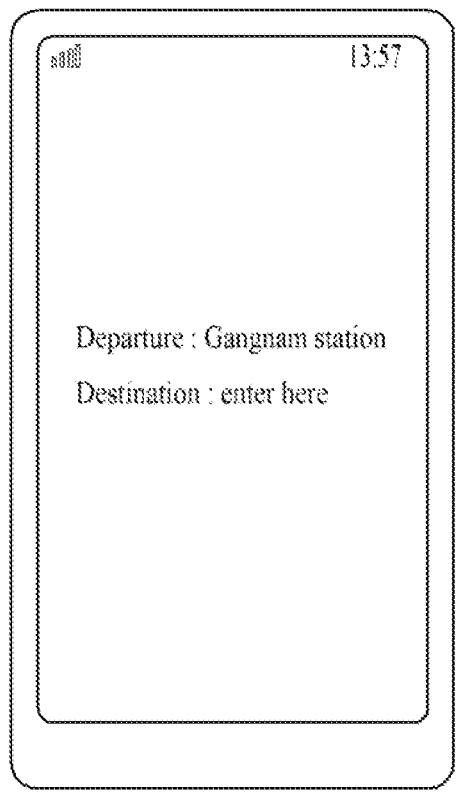
FIG. 12 to FIG. 14 are diagrams for describing that embodiments of the present disclosure are implemented in a mobile terminal device.
Figure 12:
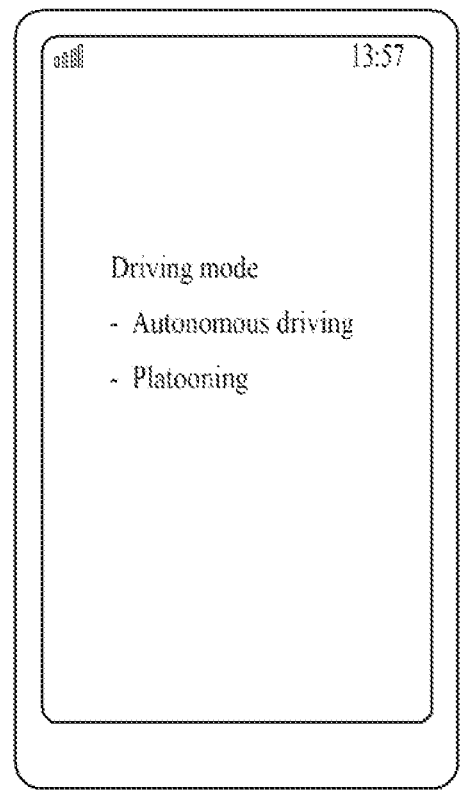
Figure 13:
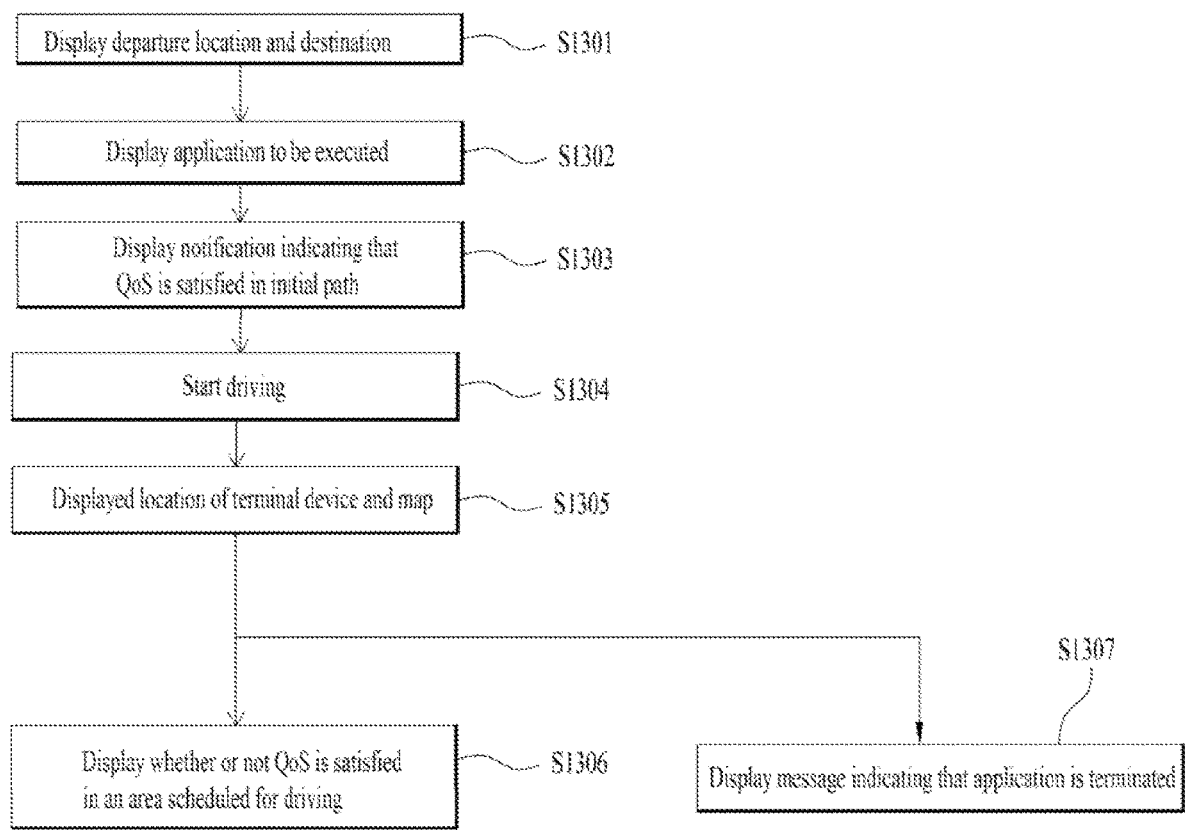

In step S1301 of FIG. 13, a departure location and a destination may be determined by the user's selection on a selection screen displayed on the display of the terminal device. Exemplarily, the display displays the departure location and the destination as shown in (a) in FIG. 12. The device may receive user inputs about the departure location and/or the destination.

In step S1302, an application to be executed (e.g., automatic driving, cluster driving, etc. as displayed in (b) in FIG. 12) may be determined via the user's selection on the selection screen displayed on the display of the terminal device. Step S1302 may be performed first, or Step S1301 and step S1302 may be performed in a combined form.

In step S1303, the terminal device may receive notification from the AF/server indicating that QoS is satisfied while moving up to 5 km from the departure location, and may display this notification on the display. This notification may be displayed together on a map showing a route along which the terminal device travels, or may be displayed separately.

In step S1304, the terminal device starts moving.

Figure 14:
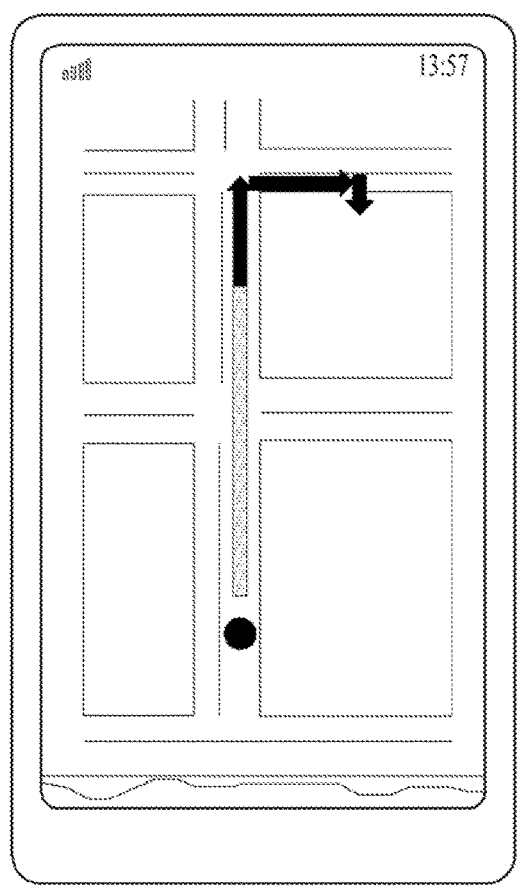
Figure 14:
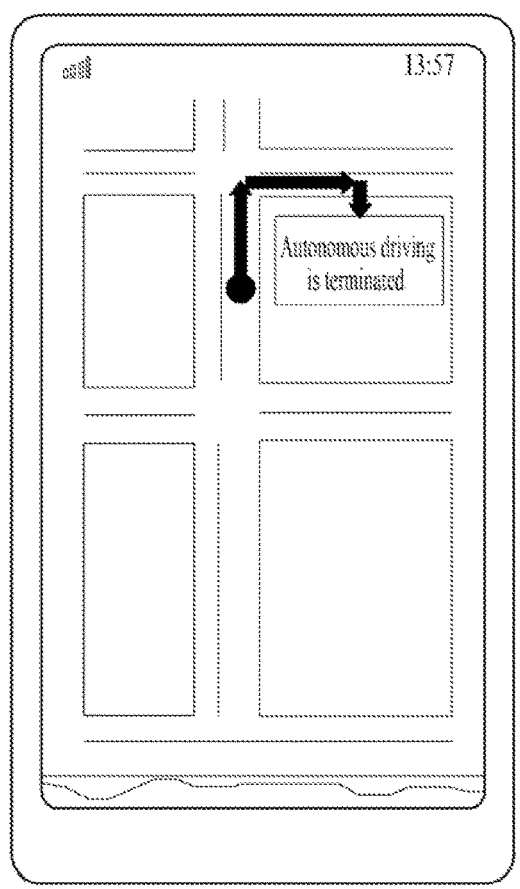

In step S1305, as illustrated in (a) in FIG. 14, as the terminal device moves, the map showing the movement path of the terminal device is displayed on the display of the terminal device, and the location of the terminal device is displayed thereon.

In step S1306, whether or not QoS is satisfied in an area toward which the terminal device is scheduled to move (for example, an arrow (a) in FIG. 14) is displayed. Whether the QoS is satisfied may be displayed such that a portion of the travel path in which QoS is satisfied and a portion thereof that QoS is satisfied may be displayed in preset colors, respectively.

Whether the QoS is satisfied may be based on the notification from the AF/server. That is, the information received from the server may be a notification indicating whether QoS is satisfied or not. Alternatively, the information received from the server may indicate whether QoS is satisfied in at least one of a predetermined area or a predetermined time. Specifically, the information received from the server may be information/table indicating whether or not QoS is satisfied for a specific time duration (interval) in a specific latitude and longitude range.

The indication may be displayed together on a map showing the path along which the terminal device travels, or may be displayed separately. Whether the QoS is satisfied may be displayed on a map indicating the travel path in the display.

When the terminal device receives the notification that QoS is not satisfied from the AF/server, or when it is determined that in a specific area/path on the travel path, QoS is not satisfied based on the determining result using the information received from the server, a warning guide may be displayed together with or instead of the notification of the QoS non-satisfaction being, as described above. The warning guide may be displayed together on a map showing the route along which the terminal device travels, or may be displayed separately. When whether or not the QoS is satisfied and the warning guide are displayed, specific information about QoS may be displayed. The specific information about QoS may refer to the contents of the various events described in step 1 of Embodiment 1.

In step S1307, when QoS is not satisfied, a message (warning guide, for example, refer to (b) in FIG. 14) indicating that the application is terminated after a preset time duration has elapsed is displayed on the display of the terminal device. That is, when the information received from the server notifies that QoS is not satisfied, the message indicating that the predetermined application is terminated after a predetermined time duration has elapsed may be displayed on the display. The predetermined application may be either automatic driving or cluster driving.

Steps S1306 and S1307 may be executed individually based on the notification from the server about whether the QoS is satisfied in the current location of the terminal device, based on the determination result by the terminal device based on the information received from the server (that is, whether the QoS is satisfied in at least one of the predetermined area or the predetermined time).

Subsequently, the QoS requirement may include at least one of QoS Packet Delay Budget (PDB), Packet Error Rate (PER), and Guaranteed Bit Rate (GBR). Further, the request includes information related to the area of the QoS prediction. The area-related information may be at least one of path-related information, geographic region information, and area-related coordinate information. The request includes QoS-related threshold level information. The threshold level information may include QoS KPI. Further, the notification may include at least one of information about an area where QoS change occurs or information about a time when QoS change occurs. The above contents are based on what is described in Embodiment 1, and portions thereof as not described in detail may refer to Embodiment 1.

Figure 15:
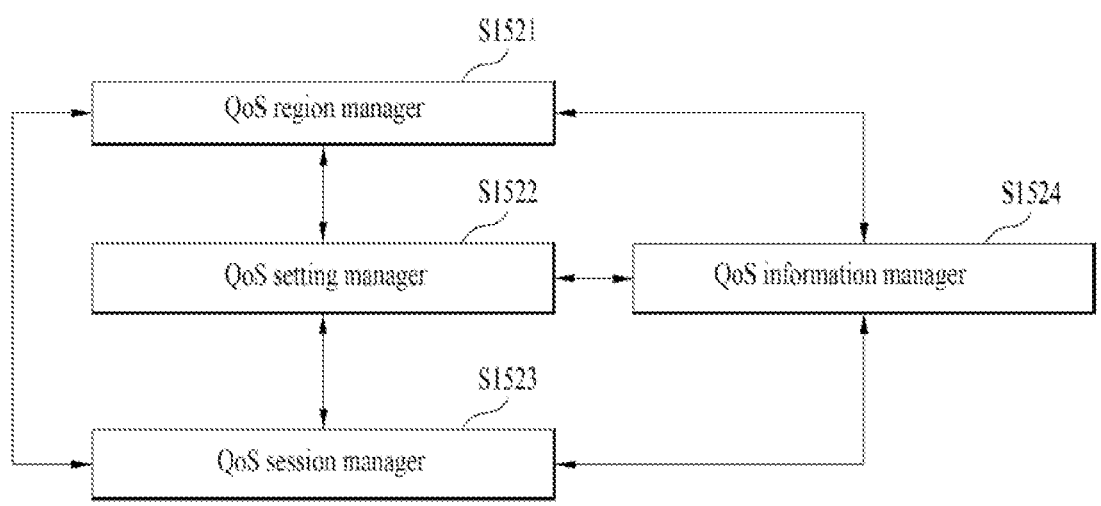
FIG. 15 is a block diagram showing a configuration of a terminal device implementing an embodiment presented in the present specification.

FIG. 15 is a block diagram showing a configuration of a terminal device implementing an embodiment presented in the present disclosure.

Referring to FIG. 15, the terminal device (or wireless device) may include a QoS region manager S1521, a QoS setting manager S1522, a QoS session manager S1523, and a QoS information manager S1524.

The QoS region manager S1521, the QoS setting manager S1522, the QoS session manager S1523 and the QoS information manager S1524 may be included in the processor 120 of FIG. 11.

The QoS region manager S1521 determines a region in which the QoS is satisfied. To this end, the QoS region manager S1521 may acquire the position information of the terminal device.

The QoS setting manager S1522 may display a setting screen (i.e., UI) related to whether or not QoS is satisfied, and receive and store therein an input from a user.

The QoS session manager S1523 may establish, modify, or disable a PDU session for QoS.

The QoS information manager S1524 receives and stores information regarding whether or not the QoS is satisfied as received from the network and then provides the information to the QoS region manager S1521, the QoS setting manager S1522 and the QoS session manager S1523.

The present disclosure as described above may be implemented using computer-readable codes on a medium in which a program is recorded. The computer-readable medium includes all kinds of recording devices that store data that may be read by a computer system. Examples of the computer-readable media include HDD (Hard Disk Drive), SSD (Solid State Disk), SDD (Silicon Disk Drive), ROM, RAM, CD-ROM, magnetic tape, floppy disk, optical data storage device, etc. The medium may be implemented in a form of a carrier wave (for example, transmission through the Internet). Further, the computer may include the processor 120 of the terminal device. Therefore, the detailed description above should not be construed as restrictive in all respects and should be considered as illustrative. The scope of the present disclosure should be determined based on rational interpretation of the appended Claims. All modifications within the equivalent scope of the present disclosure to the Claims are included in the scope of the present disclosure.

5G Usage Scenario

Figure 16:
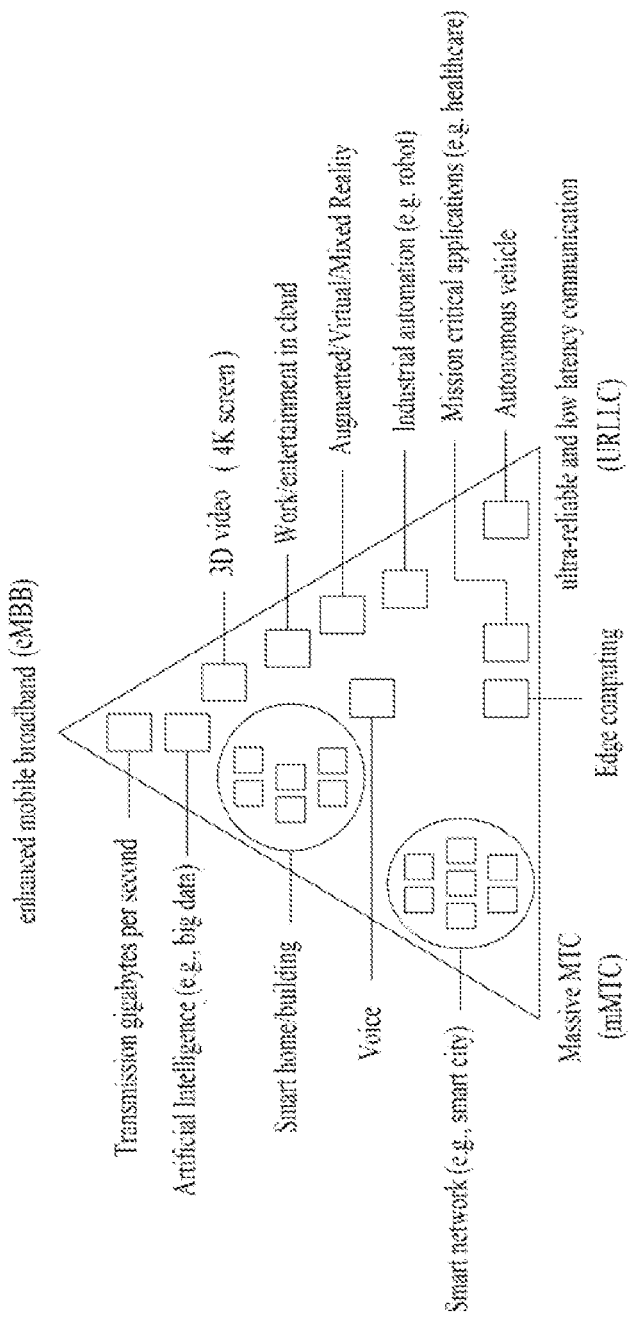
FIG. 16 shows an example of a 5G usage scenario.

FIG. 16 shows an example of a 5G usage scenario.

The 5G usage scenario shown in FIG. 16 is just an example. The technical features of the present disclosure may be applied to other 5G usage scenarios as not shown in FIG. 16.

Referring to FIG. 16, three major requirement regions of 5G include (1) enhanced mobile broadband (eMBB) region, (2) massive machine type communication (mMTC) region, and (3) high reliability/ultra-reliable and low latency communications (URLLC) region. Some use cases may require multiple regions for optimization. Another usage cases may focus on only one key performance indicator (KPI). 5G is to support these various use cases in a flexible and reliable way.

eMBB focuses on the overall improvement of data rate, latency, user density, capacity and coverage of mobile broadband access. eMBB targets a throughput of around 10 Gbps. eMBB allows functions beyond basic mobile internet access, and covers rich bi-directional work, media and entertainment applications in the cloud or in augmented reality. Data is one of key elements of 5G. The user may not be able to have dedicated voice services for the first time in the 5G era. In 5G, voice is expected to be processed as an application program simply using the data connection provided from the communication system. The main reason for the increased traffic volume is an increase in content size and an increase in the number of applications requiring high data rates. Streaming services (audio and video), interactive video and mobile Internet connections will become more prevalent as a larger number of devices connect to the Internet. These many applications require always-connectivity to push real-time information and notifications to the user. Cloud storage and applications are growing rapidly in mobile communication platforms, and may be applied to both work and entertainment. Cloud storage is a special use case that drives the growth of uplink data rates. 5G is also used for remote work in the cloud. When a tactile interface is used, 5G requires a much lower end-to-end delay to maintain a good user experience. In entertainment, for example, cloud gaming and video streaming are another key factor demanding improvements in mobile broadband capabilities. Entertainment is essential on smartphones and tablets anywhere including in highly mobile environments such as trains, cars and airplanes. Another usage example is augmented reality and information retrieval for entertainment. In this connection, augmented reality requires very low latency and instantaneous amount of data.

The mMTC is designed to enable communication between a large number of low-cost devices driven by a battery and is intended to support applications such as smart weighing, logistics, field and body sensors. mMTC targets 10 years of batteries and/or 1 million devices per 1 $km^2$. mMTC enables seamless connection of embedded sensors in all fields to form a sensor network, and is one of the most anticipated 5G usage examples. Potentially, the number of IoT devices are predicted to reach 20.4 billion by 2020. Smart networks utilizing industrial IoT are one of the regions where 5G plays a major role in enabling smart cities, asset tracking, smart utilities, agriculture and security infrastructure.

URLLC enables devices and machines to communicate with each other at high reliability, very low latency, and high availability, and thus is suitable for communication and control between autonomous vehicles, industrial control, factory automation, mission-critical applications such as remote surgery and healthcare, smart grid and public safety applications. URLLC targets a delay of about 1 ms. URLLC includes new services that will transform the industry via remote control of major infrastructures and high-reliability/ultra-low latency links such as autonomous vehicles. The level of reliability and delay is essential for smart grid control, industrial automation, robotics, drone control and coordination.

Next, a number of use examples included in the triangle in FIG. 16 will be specifically described.

5G may use means for providing streams rated from hundreds of megabits per second to gigabits per second to complement fiber-to-the-home (FTTH) and cable-based broadband (or DOCSIS). Such high speed may be required to deliver TVs with resolutions of 4K or higher (6K, 8K and higher) as well as virtual reality (VR) and augmented reality (AR). VR and AR applications involve almost immersive sports events. Certain applications may require special network configuration. For example, in the case of VR games, the game company may need to integrate the core server with the network operator's edge network server to minimize latency.

Automotive is expected to be an important new driving force in 5G, together with many use cases for mobile communication with vehicles. For example, entertainment for passengers simultaneously demands high capacity and high mobile broadband. The reason is that future users will continue to expect high-quality connections, regardless of their location and speed. Another use case in the automotive sector is an augmented reality dashboard. The augmented reality dashboard allows drivers to identify objects in the dark on top of what they are looking through the front window. The augmented reality dashboard displays, in a superimposed manner, information to inform the driver about the distance and movement of objects. In the future, wireless modules enable communication between vehicles, exchange of information between the vehicle and the supporting infrastructure, and exchange of information between the vehicle and other connected devices (e.g., devices carried by pedestrians). The safety system may lower the risk of accidents by guiding the driver through alternative courses of action to make driving safer. The next step will be a remotely controlled vehicle or an autonomous vehicle. This requires very reliable and very fast communication between different autonomous vehicles and/or between vehicles and infrastructure. In the future, autonomous vehicles will carry out all driving activities, while the driver will focus only on traffic abnormalities that the vehicle itself cannot identify. The technical requirements of autonomous vehicles require ultra-low latency and ultra-fast reliability to increase traffic safety to levels unachievable by humans.

High-density wireless sensor networks as an example of smart networks will be embedded in smart cities and smart homes referred to as smart society. A distributed network of intelligent sensors will identify the conditions for cost and energy efficient maintenance of a city or home. A similar setup may be done for each household. Temperature sensors, window and heating controllers, burglar alarms and appliances are all wirelessly connected to each other. Many of these sensors typically require low data rates, low power and low cost. However, for example, real-time HD video may be required in certain types of devices for surveillance.

The consumption and distribution of energy including heat or gas is highly decentralized, thus requiring automated control of distributed sensor networks. The smart grid interconnects these sensors using digital information and communication technologies to collect information and act accordingly. This information may include the behavior of suppliers and consumers, thereby allowing smart grids to improve efficiency, reliability, economics, sustainability of production and distribution of fuels such as electricity in an automated way. Smart grid may be viewed as another sensor network with low latency.

The health sector has many applications that may benefit from mobile communications. The communication system may support telemedicine providing clinical care from remote locations. This helps to reduce barriers to distance, and may improve access to medical services that are not consistently available in remote rural areas and is also used to save lives in critical care and emergencies. A wireless sensor network based on mobile communication may provide sensors and remote monitoring of parameters such as heart rate and blood pressure.

Wireless and mobile communications are becoming increasingly important in industrial applications. It is expensive to install and maintain the wiring. Thus, the possibility of replacing cables with reconfigurable wireless links is an attractive opportunity for many industries. However, achieving this replacement requires that the wireless connection operates at a delay, reliability and capacity similar to that of the cable, and its management is simplified. Low latency and very low probability of error are new requirements so that the wireless connection need to be connected to 5G.

Logistics and cargo tracking is an important use case for mobile communications that enables tracking of inventory and packages anywhere using a location-based information system. Logistics and freight tracking use cases typically require low data rates, but require a wide range and reliable position information.

Artificial Intelligence (AI)

AI refers to the field of studying AI or methodology for making the same, and machine learning refers to the field of defining various issues dealt with in the AI field and studying methodology for solving the various issues. The machine learning is defined as an algorithm that enhances the performance of a certain task through consistent experiences with the task.

An artificial neural network (ANN) is a model used in the machine learning and may mean a whole model of problem-solving ability which is composed of artificial neurons (nodes) that form a network by synaptic connections. The ANN may be defined by a connection pattern between neurons in different layers, a learning process for updating model parameters, and an activation function for generating an output value.

The ANN may include an input layer, an output layer, and optionally one or more hidden layers. Each layer includes one or more neurons, and the ANN may include a synapse that links neurons. In the ANN, each neuron may output the function value of the activation function for input signals, weights, and bias input through the synapse.

The model parameter refers to a parameter determined through learning and includes the weight value of a synaptic connection and the bias of a neuron. A hyperparameter means a parameter to be set in the machine learning algorithm before learning and includes a learning rate, a repetition number, a mini-batch size, and an initialization function.

The purpose of the learning of the ANN may be to determine the model parameter that minimizes a loss function. The loss function may be used as an index to determine the optimal model parameter in the learning process of the ANN.

Machine learning may be classified into supervised learning, unsupervised learning, and reinforcement learning according to learning mechanisms.

The supervised learning may refer to a method of training the ANN in a state that labels for learning data are given, and the label may mean a correct answer (or result value) that the ANN must infer when the learning data is input to the ANN. The unsupervised learning may refer to a method of training the ANN in a state that labels for learning data are not given. The reinforcement learning may refer to a method of learning an agent defined in a certain environment to select a behavior or a behavior sequence that maximizes cumulative compensation in each state.

Machine learning implemented with a deep neural network (DNN) including a plurality of hidden layers among ANNs is referred to as deep learning. The deep running is part of the machine running. The machine learning used herein includes the deep running.

Robot

A robot may refer to a machine that automatically processes or operates a given task based on its own ability. In particular, a robot having a function of recognizing an environment and making a self-determination may be referred to as an intelligent robot.

Robots may be classified into industrial robots, medical robots, home robots, military robots, etc. according to use purposes or fields.

The robot may include a driving unit having an actuator or a motor and perform various physical operations such as moving a robot joint. In addition, a movable robot may include a driving unit having a wheel, a brake, a propeller, etc. and may travel on the ground or fly in the air through the driving unit.

Autonomous Driving (Self-driving)

Autonomous driving refers to a technique of driving by itself. An autonomous driving vehicle refers to a vehicle moving with no user manipulation or with minimum user manipulation.

For example, autonomous driving may include all of a technology that maintains a driving lane, a technology that automatically adjusts the speed such as adaptive cruise control, a technology that automatically travels along a specified route, a technology that automatically sets a route when a destination is set, and travels along the set route, cooperative driving or Platooning between multiple vehicles.

The vehicle may include a vehicle having only an internal combustion engine, a hybrid vehicle having an internal combustion engine and an electric motor together, and an electric vehicle having only an electric motor. Further, the vehicle may include not only an automobile but also a train, a motorcycle, etc.

The autonomous driving vehicle may be regarded as a robot having the autonomous driving function.

Extended Reality (XR)

Extended reality is collectively referred to as virtual reality (VR), augmented reality (AR), and mixed reality (MR). The VR technology provides real-world objects and backgrounds as CG images, the AR technology provides virtual CG images on real object images, and the MR technology is a computer graphic technology of mixing and combining virtual objects with the real world.

The MR technology is similar to the AR technology in that real and virtual objects are shown together. However, the MR technology is different from the AR technology in that the AR technology uses virtual objects to complement real objects, whereas the MR technology deal with virtual and real objects in the same way.

The XR technology may be applied to a HMD, a head-up display (HUD), a mobile phone, a tablet PC, a laptop computer, a desktop computer, a TV, a digital signage, etc. A device to which the XR technology is applied may be referred to as an XR device.

Figure 17:
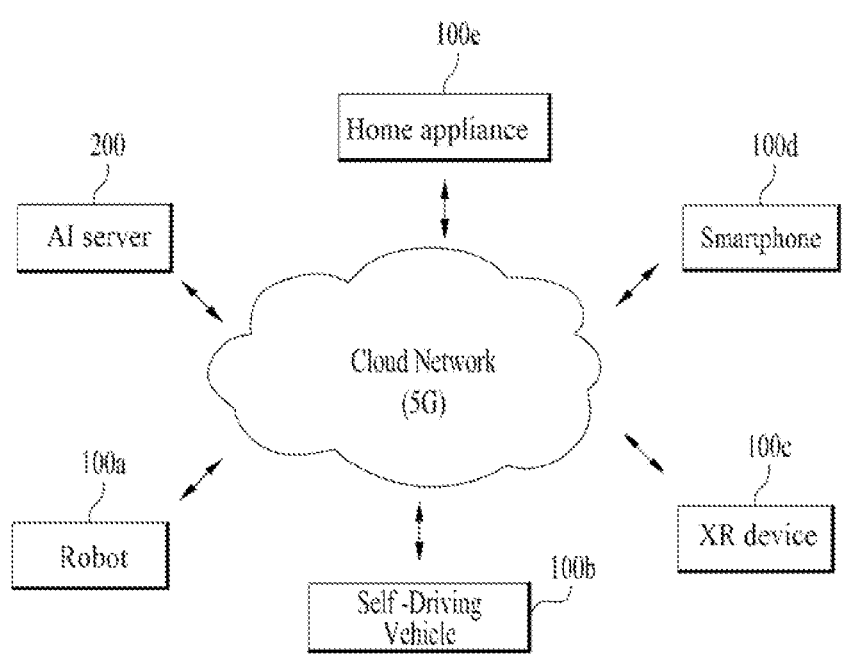
FIG. 17 shows an AI system according to an embodiment of the present disclosure.

FIG. 17 illustrates an AI system 1 according to an embodiment of the present disclosure.

Referring to FIG. 17, at least one of the AI server 200, a robot 100a, an autonomous driving vehicle 100b, an XR device 100c, a smartphone 100d, and a home appliance 100e is connected to a cloud server 10 in the AI system 1. Here, the robot 100a, the autonomous vehicle 100b, the XR device 100c, the smartphone 100d, or the home appliance 100e, to which the AI technology is applied, may be referred to as an AI device 100a to 100e.

The cloud network 10 may refer to a network configuring part of a cloud computing infrastructure or a network existing in the cloud computing infrastructure. Here, the cloud network 10 may be configured with a 3G network, a 4G or LTE network, or a 5G network.

That is, each of the devices 100a to 100e and 200 included in the AI system 1 may be connected to each other through the cloud network 10. In particular, the devices 100a to 100e and 200 may communicate with each other through a BS or may communicate with each other directly without the BS.

The AI server 200 may include a server in charge of AI processing and a server in charge of big data computation.

The AI server 200 may be connected to at least one of the robot 100a, the autonomous vehicle 100b, the XR device 100c, the smartphone 100d, or the home appliance 100e included in the AI system 1 via the cloud network 10 and help at least part of AI processing of the connected AI devices 100a to 100e.

In this case, the AI server 200 may train an ANN according to a machine learning algorithm on behalf of the AI devices 100a to 100e and directly store or transmit a learning model to the AI devices 100a to 100e.

The AI server 200 may receive input data from the AI devices 100a to 100e, infer a result value for the received input data based on the learning model, generate a response or control command based on the inferred result value, and transmit the response or control command to the AI devices 100a to 100e.

Alternatively, the AI devices 100a to 100e may directly infer the result value for the input data based on the learning model and generate the response or control command based on the inferred result value.

Hereinafter, various embodiments of the AI devices 100a to 100e to which the above-described technology is applied will be described. The AI devices 100a to 100e illustrated in FIG. 3 may be considered as a specific example of the AI device 100 illustrated in FIG. 1.

AI+Robot

If the AI technology is applied to the robot 100a, the robot 100a may be implemented as a guide robot, a transport robot, a cleaning robot, a wearable robot, an entertainment robot, a pet robot, an unmanned flying robot, etc.

The robot 100a may include a robot control module for controlling an operation, and the robot control module may refer to a software module or a chip implemented by hardware.

The robot 100a may obtain state information of the robot 100a, detect (recognize) a surrounding environment and objects, generate map data, determine a travel route or driving plan, or determine a response or action to user interaction by using sensor information obtained from various types of sensors.

To determine the travel route or driving plan, the robot 100a may use sensor information obtained from at least one of the following sensors: a LIDAR, a radar, and a camera to determine a movement route and a travel plan.

The robot 100a may perform the above-described operations based on a learning model configured with at least one ANN. For example, the robot 100a may recognize the surrounding environment and objects based on the learning model and determine an operation based on the recognized surrounding environment or object. Here, the learning model may be directly trained by the robot 100a or by an external device such as the AI server 200.

The robot 100a may operate by directly generating a result based on the learning model. Alternatively, the robot 100a may transmit sensor information to the external device such as the AI server 200 and receive a result generated based on the sensor information.

The robot 100a may determine the travel route and driving plan based on at least one of the map data, the object information detected from the sensor information, or the object information obtained from the external device. Then, the robot 100a may move according to the determined travel path and driving plan under control of its driving unit.

The map data may include object identification information about various objects placed in a space in which the robot 100a moves. For example, the map data may include object identification information about fixed objects such as walls and doors and movable objects such as flower pots and desks. The object identification information may include a name, a type, a distance, a position, etc.

The robot 100a may operate and move by controlling the driving unit based on the user control/interaction. In this case, the robot 100a may obtain intention information from the motion or speech of the user and determine a response based on the obtained intention information.

AI+Autonomous Driving

If the AI technology is applied to the autonomous driving vehicle 100b, the autonomous driving vehicle 100b may be implemented as a mobile robot, a vehicle, an unmanned flying vehicle, etc.

The autonomous driving vehicle 100b may include an autonomous driving control module for controlling the autonomous driving function, and the autonomous driving control module may refer to a software module or a chip implemented by hardware. The autonomous driving control module may be included in the autonomous driving vehicle 100b as a component thereof, but it may be implemented with separate hardware and connected to the outside of the autonomous driving vehicle 100b.

The autonomous driving vehicle 100b may obtain state information about the autonomous driving vehicle 100b based on sensor information acquired from various types of sensors, detect (recognize) a surrounding environment and objects, generate map data, determine a travel route and driving plan, or determine an operation.

Similarly to the robot 100a, the autonomous driving vehicle 100b may use the sensor information obtained from at least one of the following sensors: a LIDAR, a radar, and a camera so as to determine the travel route and driving plan.

In particular, the autonomous driving vehicle 100b may recognize an environment and objects in an area hidden from view or an area over a certain distance by receiving the sensor information from external devices. Alternatively, the autonomous driving vehicle 100b may receive information, which is recognized by the external devices.

The autonomous driving vehicle 100b may perform the above-described operations based on a learning model configured with at least one ANN. For example, the autonomous driving vehicle 100b may recognize the surrounding environment and objects based on the learning model and determine the driving path based on the recognized surrounding environment and objects. The learning model may be trained by the autonomous driving vehicle 100a or an external device such as the AI server 200.

The autonomous driving vehicle 100b may operate by directly generating a result based on the learning model. Alternatively, the autonomous driving vehicle 100b may transmit sensor information to the external device such as the AI server 200 and receive a result generated based on the sensor information.

The autonomous driving vehicle 100b may determine the travel route and driving plan based on at least one of the map data, the object information detected from the sensor information, or the object information obtained from the external device. Then, the autonomous driving vehicle 100b may move according to the determined travel path and driving plan under control of its driving unit.

The map data may include object identification information about various objects placed in a space (e.g., road) in which the autonomous driving vehicle 100b moves. For example, the map data may include object identification information about fixed objects such as street lamps, rocks, and buildings and movable objects such as vehicles and pedestrians. The object identification information may include a name, a type, a distance, a position, etc.

The autonomous driving vehicle 100b may operate and move by controlling the driving unit based on the user control/interaction. In this case, the autonomous driving vehicle 100b may obtain intention information from the motion or speech of a user and determine a response based on the obtained intention information.

AI+XR

When the AI technology is applied to the XR device 100c, the XR device 100c may be implemented as a HMD, a HUD mounted in vehicles, a TV, a mobile phone, a smartphone, a computer, a wearable device, a home appliance, a digital signage, a vehicle, a fixed robot, a mobile robot, etc.

The XR device 100c may analyze three-dimensional point cloud data or image data obtained from various sensors or external devices, generate position data and attribute data for three-dimensional points, obtain information about a surrounding environment or information about a real object, perform rendering to on an XR object, and then output the XR object. For example, the XR device 100c may output an XR object including information about a recognized object, that is, by matching the XR object with the recognized object.

The XR device 100c may perform the above-described operations based on a learning model configured with at least one ANN. For example, the XR device 100c may recognize the real object from the three-dimensional point cloud data or image data based on the learning model and provide information corresponding to the recognized real object. The learning model may be directly trained by the XR device 100c or an external device such as the AI server 200.

The XR device 100c may operate by directly generating a result based on the learning model. Alternatively, the XR device 100c may transmit sensor information to the external device such as the AI server 200 and receive a result generated based on the sensor information.

<AI+Robot+Autonomous Driving>

When the AI technology and the autonomous driving technology are applied to the robot 100a, the robot 100a may be implemented as a guide robot, a transport robot, a cleaning robot, a wearable robot, an entertainment robot, a pet robot, an unmanned flying robot, etc.

The robot 100a to which the AI technology and the autonomous driving technology are applied may refer to the robot 100a with the autonomous driving function or the robot 100a interacting with the autonomous driving vehicle 100b.

The robot 100a having the autonomous driving function may be collectively referred to as a device that move along a given movement path without human control or a device that moves by autonomously determining its movement path.

The robot 100a having the autonomous driving function and the autonomous driving vehicle 100b may use a common sensing method to determine either a travel route or a driving plan. For example, the robot 100a having the autonomous driving function and the autonomous driving vehicle 100b may determine either the travel route or the driving plan based on information sensed through a LIDAR, a radar, and a camera.

The robot 100a interacting with the autonomous driving vehicle 100b may exist separately from with the autonomous driving vehicle 100b. That is, the robot 100a may perform operations associated with the autonomous driving function inside or outside the autonomous driving vehicle 100b or interwork with a user on the autonomous driving vehicle 100b.

The robot 100a interacting with the autonomous driving vehicle 100b may control or assist the autonomous driving function of the autonomous driving vehicle 100b by obtaining sensor information on behalf of the autonomous driving vehicle 100b and providing the sensor information to the autonomous driving vehicle 100b or by obtaining sensor information, generating environment information or object information, and providing the information to the autonomous driving vehicle 100b.

Alternatively, the robot 100a interacting with the autonomous driving vehicle 100b may monitor the user on the autonomous driving vehicle 100b or control the autonomous driving vehicle 100b through the interaction with the user. For example, when it is determined that the driver is in a drowsy state, the robot 100a may activate the autonomous driving function of the autonomous driving vehicle 100b or assist the control of the driving unit of the autonomous driving vehicle 100b. The function of the autonomous driving vehicle 100b controlled by the robot 100a may include not only the autonomous driving function but also functions installed in the navigation system or audio system provided in the autonomous driving vehicle 100b.

Alternatively, the robot 100a interacting with the autonomous driving vehicle 100b may provide information to the autonomous driving vehicle 100b outside the autonomous driving vehicle 100b or assist the autonomous driving vehicle 100b outside the autonomous driving vehicle 100b. For example, the robot 100a may provide traffic information including signal information such as smart traffic lights to the autonomous driving vehicle 100b or automatically connect an electric charger to a charging port by interacting with the autonomous driving vehicle 100b like an automatic electric charger installed in an electric vehicle.

AI+Robot+XR

When the AI technology and the XR technology are applied to the robot 100a, the robot 100a may be implemented as a guide robot, a transport robot, a cleaning robot, a wearable robot, an entertainment robot, a pet robot, an unmanned flying robot, a drone, etc.

The robot 100a to which the XR technology is applied may refer to a robot subjected to control/interaction in an XR image. In this case, the robot 100a may be separated from the XR device 100c but interact with the XR device 100c.

When the robot 100a subjected to control/interaction in the XR image obtains sensor information from sensors including a camera, the robot 100a or XR device 100c may generate the XR image based on the sensor information, and then the XR device 100c may output the generated XR image. The robot 100a may operate based on a control signal input through the XR device 100c or user interaction.

For example, a user may confirm the XR image corresponding to the perspective of the robot 100a remotely controlled through an external device such as the XR device 100c. Then, the user may adjust the autonomous driving path of the robot 100a or control the operation or movement of the robot 100a through interaction therewith or check information about surrounding objects.

AI+Autonomous Driving+XR

When the AI technology and the XR technology is applied to the autonomous driving vehicle 100b, the autonomous driving vehicle 100b may be implemented as a mobile robot, a vehicle, an unmanned flying vehicle, etc.

The autonomous driving vehicle 100b to which the XR technology is applied may refer to an autonomous driving vehicle capable of providing an XR image or an autonomous driving vehicle subjected to control/interaction in an XR image. In particular, the autonomous driving vehicle 100b subjected to control/interaction in the XR image may be separated from the XR device 100c but interact with the XR device 100c.

The autonomous driving vehicle 100b capable of providing the XR image may obtain sensor information from sensors including a camera and output the generated XR image based on the obtained sensor information. For example, the autonomous driving vehicle 100b may include an HUD for outputting an XR image, thereby providing a user with an XR object corresponding to an object in the screen together with a real object.

When the XR object is displayed on the HUD, at least part of the XR object may overlap with the real object which the user look at. On the other hand, when the XR object is displayed on a display provided in the autonomous driving vehicle 100b, at least part of the XR object may overlap with the object in the screen. For example, the autonomous driving vehicle 100b may output XR objects corresponding to objects such as a lane, another vehicle, a traffic light, a traffic sign, a two-wheeled vehicle, a pedestrian, a building, etc.

When the autonomous driving vehicle 100b subjected to control/interaction in the XR image may obtain the sensor information from the sensors including the camera, the autonomous driving vehicle 100b or the XR device 100c may generate the XR image based on the sensor information, and then the XR device 100c may output the generated XR image. The autonomous driving vehicle 100b may operate based on a control signal input through an external device such as the XR device 100c or user interaction.

The preferred embodiments of the present disclosure have been exemplarily described, but the scope of the present disclosure is not limited to such specific embodiments. The present disclosure may be modified, changed, or improved in various forms within the scope of the idea of the present disclosure and the scope of the claims.

INDUSTRIAL AVAILABILITY

The various embodiments of the present disclosure as described above have been described based on the 3GPP system, but may be applied to various mobile communication systems in the same manner.

What is claimed is:

1. A mobile terminal device comprising:
    a display for displaying a travel path and whether QoS (Quality of Service) is satisfied; and
    a controller configured to control the display,
    wherein whether the QoS is satisfied is based on information received from a server having received a notification related to QoS prediction from a network data analytics function (NWDAF),
    wherein the notification related to the QoS prediction is due to a request related to a QoS prediction subscription transmitted from the server to the NWDAF,
    wherein the request includes a QoS requirement for the QoS prediction,
    wherein the information received from the server includes a notification indicating that the QoS is satisfied or not, and
    wherein when the information received from the server indicates that the QoS is not satisfied, a message indicating that a predetermined application is terminated after a predetermined time duration has elapsed is displayed on the display.

2. The device of claim 1, wherein the information received from the server indicates whether the QoS is satisfied in at least one of a predetermined area or a predetermined time.

3. The device of claim 1, wherein whether the QoS is satisfied is displayed on a map indicating the travel path on the display.

4. The device of claim 1, wherein when the information received from the server indicates that the QoS is not satisfied, a warning guide is displayed on the display.

5. The device of claim 4, wherein the warning guide is displayed together specific information about QoS.

6. The device of claim 1, wherein the predetermined application is one of automatic driving or cluster driving.

7. The device of claim 2, wherein whether the QoS is satisfied is displayed such that a portion of the travel path in which the QoS is satisfied and a portion of the travel path in which the QoS is not satisfied are displayed in preset colors, respectively.

8. The device of claim 1, wherein the QoS requirement includes at least one of QoS PDB (Packet Delay Budget), PER (Packet Error Rate), or GBR (Guaranteed Bit Rate).

9. The device of claim 1, wherein the request includes information related to an area of the QoS prediction, wherein the information related to the area of the QoS prediction includes at least one of path-related information, geographic region information, or area-related coordinate information.

10. The device of claim 1, wherein the request includes QoS-related threshold level information, wherein the threshold level information includes QoS key performance indicator (KPI).

11. The device of claim 1, wherein the notification includes at least one of information about an area in which QoS change occurs or information about a time in which QoS change occurs.

12. A method of processing QoS (Quality of Service) information, by an user equipment (UE), the method comprising:
- receiving information related to QoS prediction,
- wherein the information is received from a server having received a notification related to the QoS prediction from a network data analytics function (NWDAF),
- wherein the notification related to the QoS prediction is due to a request related to a QoS prediction subscription transmitted from the server to the NWDAF, and
- wherein the request includes a QoS requirement for the QoS prediction; and
- displaying the information,
- wherein the information received from the server includes a notification indicating that QoS is satisfied or not,
- wherein the method further comprises determining that the QoS is not satisfied based on the information received from the server, and
- wherein displaying the information comprises displaying a message indicating that a predetermined application is terminated after a predetermined time duration has elapsed.

* * * * *